United States Patent
Knatt

(10) Patent No.: US 9,845,982 B2
(45) Date of Patent: Dec. 19, 2017

(54) VARIABLE-OPERATING POINT COMPONENTS FOR CUBE ICE MACHINES

(71) Applicant: True Manufacturing Company, Inc., O'Fallon, MO (US)

(72) Inventor: Kevin Knatt, St. Louis, MO (US)

(73) Assignee: TRUE MANUFACTURING COMPANY, INC., O'Fallon, MO (US)

( * ) Notice: Subject to any disclaimer, the term of this patent is extended or adjusted under 35 U.S.C. 154(b) by 175 days.

(21) Appl. No.: 14/591,650

(22) Filed: Jan. 7, 2015

(65) Prior Publication Data

US 2015/0192338 A1 Jul. 9, 2015

Related U.S. Application Data

(60) Provisional application No. 61/924,907, filed on Jan. 8, 2014.

(51) Int. Cl.
*F25C 1/00* (2006.01)
*F25B 49/02* (2006.01)
(Continued)

(52) U.S. Cl.
CPC ............... *F25C 1/00* (2013.01); *F25B 49/02* (2013.01); *F25B 49/025* (2013.01); *F25C 1/12* (2013.01); *F25B 40/00* (2013.01); *F25B 2400/0403* (2013.01); *F25B 2400/0411* (2013.01); *F25B 2600/0253* (2013.01); *F25B 2600/111* (2013.01); *F25B 2600/13* (2013.01); *F25B 2600/2501* (2013.01);
(Continued)

(58) Field of Classification Search
CPC .... F25C 1/00; F25C 2600/04; F25C 2700/04; F25C 2700/14; Y02B 30/743; Y02B 30/745; F25B 2400/0403; F25B 2400/0411; F25B 2600/2501; F25B 2700/1933; F25B 2700/2115; F25B 2600/111; F25B 2600/0253; F25B 2600/013

See application file for complete search history.

(56) References Cited

U.S. PATENT DOCUMENTS 4,897,099 A  1/1990  Ruff
4,970,877 A  11/1990  Dimijian
(Continued)

OTHER PUBLICATIONS

Patent Cooperation Treaty, International Search Report dated Apr. 28, 2015, for PCT/2015/010471, 3 pages.

*Primary Examiner* — Emmanuel Duke
(74) *Attorney, Agent, or Firm* — Bryan Cave LLP

(57) ABSTRACT

An ice maker for forming ice during a cooling cycle, the ice maker having a variable-speed compressor, a condenser, and an evaporator, wherein the variable-speed compressor, the condenser, and the evaporator are in fluid communication by one or more refrigerant lines. The ice maker further includes a freeze plate thermally coupled to the evaporator, a water pump, a sensing device for identifying a state of the cooling cycle, and a controller adapted to control the speed of the variable-speed compressor based on the identified state of the cooling cycle. The ice maker may also include a variable-speed condenser fan which may be controlled by the controller based on the identified state of the cooling cycle. Additionally, the water pump may be a variable-speed water pump which may be controlled by the controller based on the identified state of the cooling cycle.

18 Claims, 11 Drawing Sheets

(51) Int. Cl.
 *F25C 1/12* (2006.01)
 *F25B 40/00* (2006.01)
(52) U.S. Cl.
 CPC ............ *F25B 2600/2513* (2013.01); *F25B 2700/1933* (2013.01); *F25B 2700/21151* (2013.01); *F25C 2600/04* (2013.01); *F25C 2700/04* (2013.01); *F25C 2700/14* (2013.01); *Y02B 30/741* (2013.01); *Y02B 30/743* (2013.01); *Y02B 30/745* (2013.01)

(56) References Cited

U.S. PATENT DOCUMENTS

| | | | |
|---|---|---|---|
| 5,289,691 A | | 3/1994 | Schlosser et al. |
| 5,477,694 A | * | 12/1995 | Black .................. F25C 1/12 62/137 |
| 5,711,159 A | | 1/1998 | Whipple, III |
| 6,857,287 B1 | * | 2/2005 | Alsenz ................ F25B 1/00 62/45.1 |
| 8,490,417 B2 | | 7/2013 | Bippus et al. |
| 8,813,511 B2 | | 8/2014 | Kopko et al. |
| 2005/0109056 A1 | * | 5/2005 | Rand .................... F25B 5/04 62/340 |
| 2011/0276182 A1 | * | 11/2011 | Seem .................. F25B 49/027 700/276 |
| 2013/0152610 A1 | | 6/2013 | Leaver et al. |
| 2013/0305751 A1 | * | 11/2013 | Gomes ................ F25D 11/02 62/89 |

\* cited by examiner

VARIABLE-OPERATING POINT COMPONENTS FOR CUBE ICE MACHINES

RELATED APPLICATION

This application claims priority to U.S. Provisional Patent App. No. 61/924,907, filed on Jan. 8, 2014, the contents of which are incorporated herein by reference in their entirety.

FIELD OF THE INVENTION

This invention relates generally to automatic ice making machines and, more particularly, to ice making machines comprising variable-operating point components including a variable-speed water pump and a refrigeration system having a variable-speed compressor and a variable-speed condenser fan.

BACKGROUND OF THE INVENTION

Ice making machines, or ice makers, that employ freeze plates which comprise lattice-type cube molds and have gravity water flow and ice harvest are well known and in extensive use. Such machines have received wide acceptance and are particularly desirable for commercial installations such as restaurants, bars, motels and various beverage retailers having a high and continuous demand for fresh ice.

In these ice makers, water is supplied at the top of a freeze plate which directs the water in a tortuous path toward a water pump. A portion of the supplied water collects on the freeze plate, freezes into ice and is identified as sufficiently frozen by suitable means whereupon the freeze plate is defrosted such that the ice is slightly melted and discharged therefrom into a bin. Typically, these ice machines can be classified according to the type of ice they make. One such type is a grid style ice maker which makes generally square ice cubes that form within individual grids of the freeze plate which then form into a continuous sheet of ice cubes as the thickness of the ice increases beyond that of the freeze plate. After harvesting, the sheet of ice cubes will break into individual cubes as they fall into the bin. Another type of ice maker is an individual ice cube maker which makes generally square ice cubes that form within individual grids of the freeze plate which do not form into a continuous sheet of ice cubes. Therefore, upon harvest individual ice cubes fall from the freeze plate and into the bin. A controller controls the operation of the ice maker to ensure a constant supply of ice.

The cooling cycle of typical ice makers is comprised of two sub-cycles, the sensible cooling cycle and the latent cooling cycle. During the sensible cooling cycle the supplied water is continuously recirculated across the freeze plate and back to the water pump thereby cooling the supplied water. Once the supplied water reaches the freezing point the supplied water begins to freeze in the freeze plate, the latent cooling cycle begins and the amount of water falling from the freeze plate back to the water pump decreases slightly as ice is formed on the freeze plates.

Traditionally, the principal components of a refrigeration system for use in an ice maker include a refrigerant flowing serially through a compressor, a condenser, a thermal expansion valve, and an evaporator. The evaporator is thermally coupled to the freeze plate in order to freeze the supplied water into ice. However, the refrigeration load at any given point during the sensible cooling cycle is driven by water temperature and the refrigeration load at any given point during the latent cooling cycle is driven primarily by the thickness of the layer of ice on the freeze plate. As the water temperature drops during the sensible cooling cycle and as the thickness of the ice on the freeze plate increases through the latent cooling cycle, the corresponding refrigeration load on the ice maker decreases through the cooling cycle.

SUMMARY OF THE INVENTION

Briefly, therefore, one aspect of the invention is directed to an ice maker for forming ice during a cooling cycle, the ice maker comprising a variable-speed compressor, a condenser, and an evaporator, wherein the variable-speed compressor, the condenser, and the evaporator are in fluid communication by one or more refrigerant lines. A refrigerant flows through the one or more refrigerant lines. The ice maker further includes a freeze plate thermally coupled to the evaporator, a water pump for supplying water to the freeze plate, and a controller adapted to control the speed of the variable-speed compressor during the cooling cycle.

Another aspect of the invention is directed to an ice maker for forming ice during a cooling cycle, the ice maker comprising a variable-speed compressor, a condenser, and an evaporator, wherein the variable-speed compressor, the condenser, and the evaporator are in fluid communication by one or more refrigerant lines. A refrigerant flows through the one or more refrigerant lines. The ice maker further includes a freeze plate thermally coupled to the evaporator, a water pump for supplying water to the freeze plate, and a controller adapted operate the variable-speed compressor at a first speed during a sensible cooling cycle, a second speed during a latent cooling cycle, and a third speed during a harvest cycle.

Another aspect of the invention is directed to an ice maker for forming ice during a cooling cycle, the ice maker comprising a variable-speed compressor, a condenser, and an evaporator, wherein the variable-speed compressor, the condenser, and the evaporator are in fluid communication by one or more refrigerant lines. A refrigerant flows through the one or more refrigerant lines. The ice maker further includes a freeze plate thermally coupled to the evaporator, a water pump for supplying water to the freeze plate, a sensing device adapted to identify a state of the cooling cycle, and a controller adapted to control the speed of the variable-speed compressor based on the identified state of the cooling cycle.

Yet another aspect of the invention is directed to an ice maker that further includes a variable-speed condenser fan. The controller is adapted to further control the speed of the variable-speed condenser fan based on the identified state of the cooling cycle.

Yet another aspect of the invention is directed to an ice maker wherein the water pump is a variable-speed water pump and wherein the controller is further adapted to control the speed of the variable-speed water pump based on the identified state of the cooling cycle.

Yet another aspect of the invention is directed to an ice maker having a refrigeration system for forming ice using a refrigerant capable of transitioning between liquid and gaseous states, the ice maker comprising a variable-speed compressor, a condenser, a thermal expansion device, and an evaporator. The ice maker further includes a freeze plate thermally coupled to the evaporator, a water pump, a sensing device for identifying a state of the cooling cycle, and a controller adapted to control the speed of the variable-speed compressor based on the identified state of the cooling cycle.

Yet another aspect of the invention is directed to a method of controlling an ice maker for forming ice during a cooling cycle. The ice maker comprises a variable-speed compressor, a condenser, and an evaporator, wherein the variable-speed compressor, the condenser, and the evaporator are in fluid communication by one or more refrigerant lines. A refrigerant flows through the one or more refrigerant lines. The ice maker further includes a freeze plate thermally coupled to the evaporator, a water pump for supplying water to the freeze plate, a sensing device adapted to identify a state of the cooling cycle, and a controller adapted to control the speed of the variable-speed compressor based on the identified state of the cooling cycle. The method comprises identifying the state of a cooling cycle in the ice maker, calculating a desired compressor speed of the variable-speed compressor based upon the identified state of the cooling cycle, and varying the speed of the variable-speed compressor to the desired compressor speed thereby varying the mass flow rate of the refrigerant.

Yet another aspect of the invention is directed to a method of controlling an ice maker having a refrigeration system for forming ice using a refrigerant capable of transitioning between liquid and gaseous states, the ice maker comprising a variable-speed compressor, a condenser, a thermal expansion device, an evaporator, a freeze plate thermally coupled to the evaporator, a water pump, a sensing device for identifying a state of the cooling cycle, and a controller adapted to control the speed of the variable-speed compressor based on the identified state of the cooling cycle. The method comprises identifying the state of a cooling cycle in the ice maker, calculating a desired compressor speed of the variable-speed compressor based upon the identified state of the cooling cycle, and varying the speed of the variable-speed compressor to the desired compressor speed thereby varying the mass flow rate of the refrigerant.

BRIEF DESCRIPTION OF THE FIGURES

These and other features, aspects and advantages of the invention will become more fully apparent from the following detailed description, appended claims, and accompanying drawings, wherein the drawings illustrate features in accordance with exemplary embodiments of the invention, and wherein:

DETAILED DESCRIPTION

Figure 1:
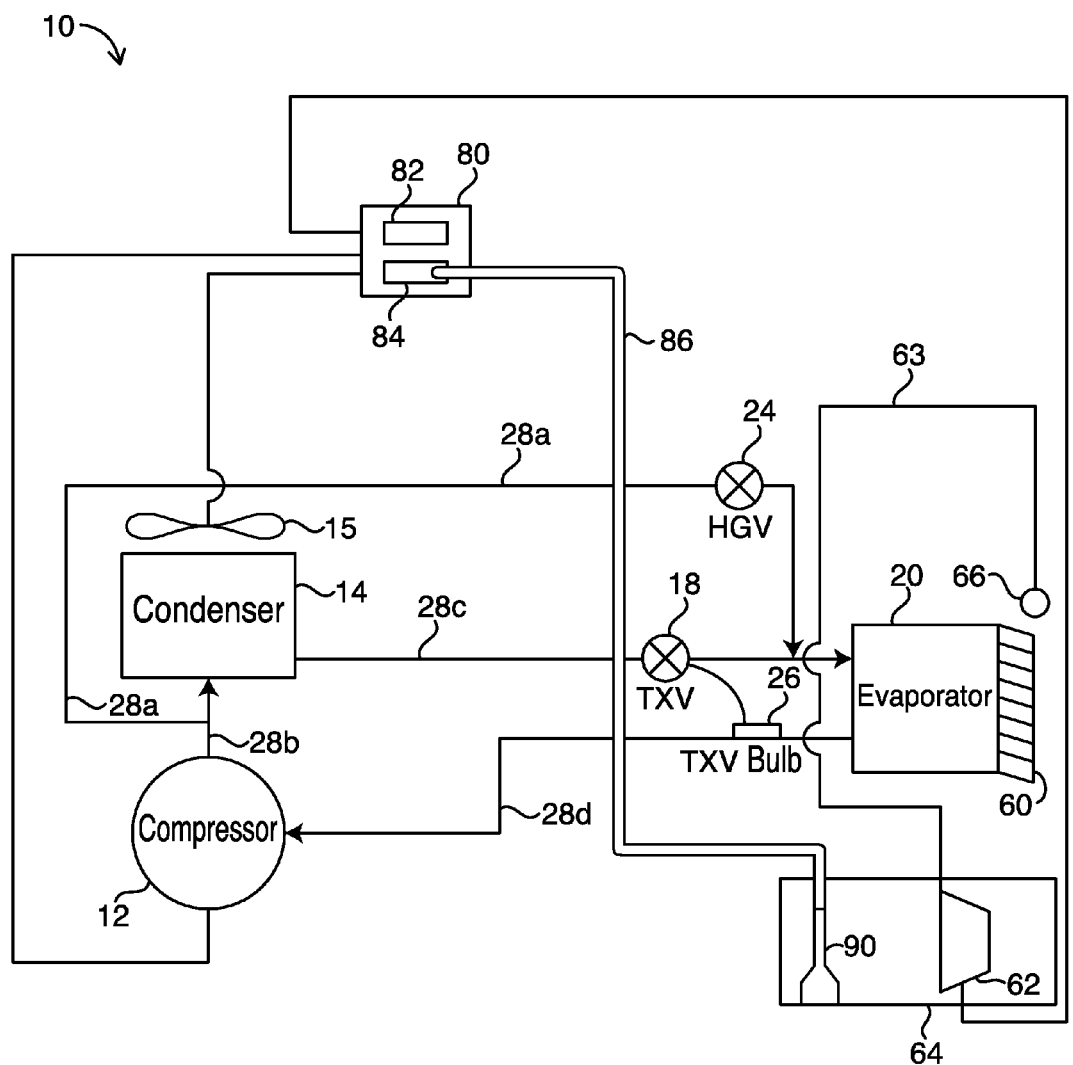
FIG. 1 is a schematic drawing of an ice maker having variable-operating point components and a controller with a pressure sensor for identifying the state of the cooling cycle and controlling the operating points of the variable-operating point components according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. All numbers expressing measurements and so forth used in the specification and claims are to be understood as being modified in all instances by the term "about." It should also be noted that any references herein to front and back, right and left, top and bottom and upper and lower are intended for convenience of description, not to limit an invention disclosed herein or its components to any one positional or spatial orientation.

Variable-Operating Components for Varying During Latent Cooling

The refrigeration systems of conventional ice makers are typically sized for maximum cooling capacity. However, the variation in the refrigeration load throughout the sensible cooling cycle is less than the variations in the refrigeration load throughout the latent cooling cycle. Accordingly, for the majority of the cooling cycle, the compressor and related components are grossly over-sized for the system resulting in reduced operating efficiencies and higher than necessary pressure differentials.

Thus an improved ice maker is described that includes variable-operating point components including, in various embodiments, combinations of a variable-speed water pump, a variable-speed compressor, a variable-speed condenser fan, and a thermostatic or electronic thermal expansion valve, wherein the variable-operating point components may be controlled based upon the state of the cooling cycle to provide increased efficiency. In various embodiments, for example, the variable-operating point components operate at substantially one operating point during the sensible cooling cycle, while operating at variable-operating points as the refrigeration load drops during the latent cooling cycle. In other embodiments, for example, the variable-operating point components operate at variable-operating points during the sensible cooling cycle and the latent cooling cycle. In yet other embodiments, for example, the variable-speed compressor can operate at variable speeds during the sensible cooling cycle, the latent cooling cycle, and/or the harvest cycle. By operating the variable-operating point components operate at variable-operating points during one or more of the sensible cooling cycle, the latent cooling cycle, and the harvest cycle, greater energy efficiency gains and savings can be achieved as compared to single-operating point components.

FIG. 1 illustrates certain principal components of one embodiment of ice maker 10, which includes variable-operating point components, wherein the variable-operating points may comprise variable-speeds. Ice maker 10 includes a variable-speed compressor 12, a condenser 14 for condensing compressed refrigerant vapor discharged from the variable-speed compressor 12, a variable-speed condenser fan 15, a thermal expansion device 18 for lowering the temperature and pressure of the refrigerant, and an evaporator 20. The thermal expansion device 18 may include, but is not limited to, a capillary tube, a thermostatic expansion valve or an electronic expansion valve. Ice maker 10 also includes a freeze plate 60 thermally coupled to evaporator 20. Freeze plate 60 may contain a large number of pockets (usually in the form of a grid of cells) on its surface where water flowing over the surface can collect. As water is pumped from sump 64 by variable-speed water pump 62 through water line 63 and out of distributor manifold or tube 66, the water impinges freeze plate 60, flows over the pockets of freeze plate 60 and freezes into ice. Sump 64 may be positioned below freeze plate 60 to catch any water coming off of freeze plate 60 such that the water may be recirculated by variable-speed water pump 62. Freeze plate 60 as described herein may encompass any number of types of molds for creating a continuous sheet of ice cubes, individual ice cubes, and/or cubes of different shapes. Furthermore, embodiments of the invention can be adapted to various types of ice makers (e.g., grid style, individual cube style), and to others not identified, without departing from the scope of the invention.

Variable-speed compressor 12, variable-speed condenser fan 15, and variable-speed water pump 64 are each driven by variable-speed motors (not shown). The variable-speed motors of each of variable-speed compressor 12, variable-speed condenser fan 15, and variable-speed water pump 64 are preferably continuously variable-speed motors that are adapted to run at any speed within a continuum of speeds. Such variable-speed motors may be electrically communicated motors ("ECM"). Alternatively, the variable-speed motors of each of variable-speed compressor 12, variable-speed condenser fan 15, and variable-speed water pump 64 may comprise a motor adapted to operate at multiple (e.g., two, three, four, or more) specific speeds.

Ice maker 10 may also include a temperature sensing bulb 26 placed at the outlet of the evaporator 20 to control thermal expansion device 18. In other embodiments, a temperature sensor 25 and a pressure transducer 29 may be used in place of a temperature sensing bulb (see FIGS. 11, 12) if an electronic expansion valve 118 (see FIGS. 11, 12) is used, wherein temperature sensor 25 and pressure transducer 29 may provide a temperature reading and pressure reading, respectively, of the refrigerant in suction line 28d to controller 80. Controller 80 can then control the opening of the electronic expansion valve 18 based on temperature and pressure. Hot gas valve 24 directs warm refrigerant from variable-speed compressor 12 directly to evaporator 20 to remove or harvest ice cubes from freeze plate 60 when the ice has reached the desired thickness. Ice maker 10 may also include a harvest sensor switch (not shown) as known in the art for sensing when the ice has dropped from freeze plate 60 so that controller 80 can stop harvesting ice and resume making ice. As described more fully elsewhere herein, a form of refrigerant cycles through these components via lines 28a, 28b, 28c, 28d. Ice maker 10 may have other conventional components not described herein, including a water supply, an ice bin, and a source of electrical energy.

Figure 2:
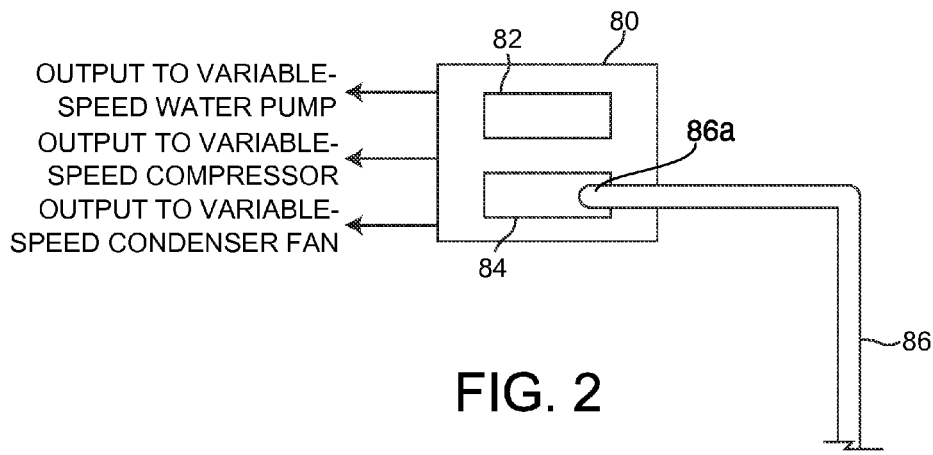
FIG. 2 is a schematic drawing of a controller for controlling the variable-operating point components of an ice maker.

Ice maker 10 may also comprise a controller 80. Controller 80 is preferably located remote from evaporator 20 and sump 64. As illustrated in FIG. 2, controller 80 includes a processor 82 for controlling the operation of ice making machine 10. Controller 80 may also include, or be coupled to, a pressure sensor 84, which may be used to identify the state of the cooling cycle during the latent cooling cycle of ice maker 10 by correlating water pressure in sump 64 to the thickness of ice on freeze plate 60. Pressure sensor 84 may be a monolithic silicon pressure sensor that can output a signal to processor 82 that is proportional to the applied pressure of water within sump 64. Using the output from pressure sensor 84, processor 82 can determine the state of the cooling cycle based upon the amount of water that has been converted to ice. As thickness of ice in the freeze plate during the latent cooling cycle increases, the refrigeration load may decrease, thus controller 80 can calculate and set the operating points of the variable-operating point components of ice maker 10 based upon the state of the cooling cycle in relation to the refrigeration load. Accordingly, improved efficiencies for ice maker 10 may be achieved through the use of the variable-speed compressor 12 which can vary the liquid refrigerant mass flow rate based on the state of the cooling cycle, e.g. the mass flow of liquid refrigerant can be reduced as the thickness of ice on freeze plate 60 increases over the cooling cycle. The use of pressure sensor 84 also allows processor 82 to determine the appropriate time at which to initiate an ice harvest cycle as well as control the fill and purge functions. In certain embodiments, pressure sensor 84 may be a pressure transducer, such as part number MPXV5004 from Freescale Semiconductor of Austin, Tex.

Figure 3:
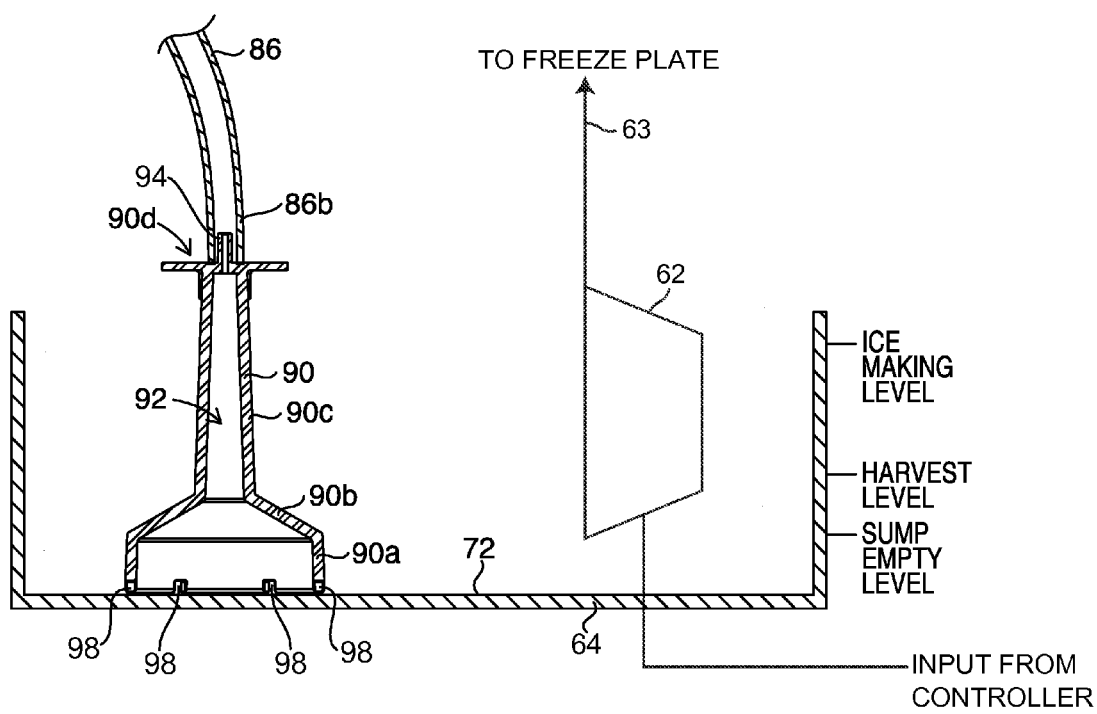
FIG. 3 is a section view of a sump having a fitting which allows for the measurement of water pressure in the sump according to one embodiment of the invention.

Referring now to FIGS. 2 and 3, an embodiment of air fitting 90 and pneumatic tube of the control system is described in detail. In certain embodiments, air pressure sensor 84 may be connected to sump 64 by pneumatic tube 86 having a proximal end 86*a* and a distal end 86*b*. Proximal end 86*a* of pneumatic tube 86 is connected to air pressure sensor 84 and distal end 86*b* of pneumatic tube 86 is connected to and in fluid communication with air fitting 90. Air fitting 90 may be positioned in sump 64 and includes base portion 90*a*, first portion 90*b*, second portion 90*c*, and top portion 90*d* all in fluid communication with the water proximate bottom 72 of sump 64. Base portion 90*a*, first portion 90*b*, second portion 90*c*, and top portion 90*d* of air fitting 90 define a chamber 92 in which air may be trapped. One or more openings 98 surround the perimeter of base portion 90*a* allowing the water proximate bottom 72 of sump 64 to be in fluid communication with the air in chamber 92 of air fitting 90. As the water level in sump 64 increases, the pressure of the water proximate bottom 72 of sump 64 is communicated to the air in chamber 92 through the one or more openings 98 of air fitting 90. The air pressure inside chamber 92 increases and this pressure increase is communicated via air through pneumatic tube 86 to air pressure sensor 84. Controller 80 can thus determine the water level in sump 64. Additionally, as the water level in sump 64 decreases, the pressure in chamber 92 also decreases. This pressure decrease is communicated via air through pneumatic tube 86 to air pressure sensor 84. Controller 80 can thus determine the water level in the sump 64.

Base portion 90*a* of air fitting 90 may be substantially circular and may have a large diameter which may assist in reducing or eliminating capillary action of water inside chamber 92. First portion 90*b* may be substantially conical in shape and accordingly transition between the large diameter of base portion 90*a* to the smaller diameter of second portion 90*c*. Second portion 90*c* may taper from first portion 90*b* to top portion 90*d*. Disposed proximate top portion 90*d* may be a connector 94 to which distal end 86*b* of pneumatic tube 86 is connected. Connector 94 may be any type of pneumatic tubing connector known in the art, including, but not limited to, a barb, a nipple, etc.

By placing air pressure sensor 84 in remotely located controller 80, air pressure sensor 84 is not located in the food zone. Due to such placement, air pressure sensor 84 may not be affected by the minerals or scale that the supply water can leave behind because air pressure sensor 84 does not come into contact with water. Additionally, because air pressure sensor 84 does not come into contact with water it may not be affected by the electrical properties of water and can therefore be used to determine ice thickness for de-ionized supply water and supply water with a heavy mineral content. Also, in certain embodiments, air pressure sensor 84 has no moving parts and therefore may not be susceptible to inconsistencies in its placement within ice maker 10 or changes over time as ice maker 10 ages. In certain embodiments, the position of air pressure sensor 84 and the position of air fitting 90 are not adjustable. Accordingly, in various embodiments, the ice thickness, the amount of water filled into sump 64, and the amount of water used each cycle can be measured, controlled, and adjusted electronically. In other embodiments, controller 80 may also include, or be coupled to, any commercially available device for measuring water level in sump 64 in addition to or in replacement of pressure sensor 84.

Controller 80 includes a processor-readable medium storing code representing instructions to cause controller 80 to perform a process. Controller 80 may be, for example, a commercially available microprocessor, an application-specific integrated circuit (ASIC) or a combination of ASICs, which are designed to achieve one or more specific functions, or enable one or more specific devices or applications. In yet another embodiment, controller 80 may be an analog or digital circuit, or a combination of multiple circuits. Controller 80 may also include a memory component for storing data in a form retrievable by controller 80. Controller 80 can store data in or retrieve data from the memory component.

Referring again to FIGS. 1 and 2, controller 80 may also comprise components to communicate with variable-speed compressor 12, variable-speed condenser fan 15, and/or variable-speed water pump 62 external to controller 80 by way of an input/output (I/O) component (not shown). In other embodiments, for example, controller 80 may comprise other input/output (I/O) components to communicate with and/or control a water supply valve(s) (not shown), a water purge valve(s) (not shown), hot gas valve 24 and/or thermal expansion device 18, wherein the thermal expansion device may be an electronic expansion valve. In other embodiments, for example, controller 80 may comprise other input/output (I/O) components to communicate with a variety of sensors and/or switches including, but not limited to, pressure transducers, temperature sensors, acoustic sensors, harvest switches, etc. According to one or more embodiments of the invention, the I/O component can include a variety of suitable communication interfaces. For example, the I/O component can include wired connections, such as standard serial ports, parallel ports, universal serial bus (USB) ports, S-video ports, local area network (LAN) ports, and small computer system interface (SCSI) ports. Additionally, the I/O component may include, for example, wireless connections, such as infrared ports, optical ports, Bluetooth® wireless ports, wireless LAN ports, or the like.

In one embodiment, controller 80 may be connected to a network (not shown), which may be any form of interconnecting network including an intranet, such as a local or wide area network, or an extranet, such as the World Wide Web or the Internet. The network can be physically implemented on a wireless or wired network, on leased or dedicated lines, including a virtual private network (VPN).

Having described each of the individual components of one embodiment of ice maker 10, the manner in which the components interact and operate in this embodiment may now be described. During operation of ice maker 10 in a cooling cycle, comprising both a sensible cycle and a latent cycle, variable-speed compressor 12 receives low-pressure, substantially gaseous refrigerant from evaporator 20 through suction line 28*d*, pressurizes the refrigerant, and discharges high-pressure, substantially gaseous refrigerant through discharge line 28*b* to condenser 14. In condenser 14, heat is removed from the refrigerant, causing the substantially gaseous refrigerant to condense into a substantially liquid refrigerant. To assist the removal of heat from the refrigerant, a variable-speed condenser fan 15 may be positioned to blow air across condenser 14.

In one embodiment, after exiting condenser 14, the high-pressure, substantially liquid refrigerant is routed through liquid line 28*c* to thermostatic or electronic thermal expansion device 18, which reduces the pressure of the substantially liquid refrigerant for introduction into evaporator 20. As the low-pressure expanded refrigerant is passed through tubing of evaporator 20, the refrigerant absorbs heat from the tubes contained within evaporator 20 and vaporizes as the refrigerant passes through the tubes. Low-pressure, substantially gaseous refrigerant is discharged from the outlet of evaporator 20 through suction line 28d, and is reintroduced into the inlet of variable-speed compressor 12.

Figure 4:
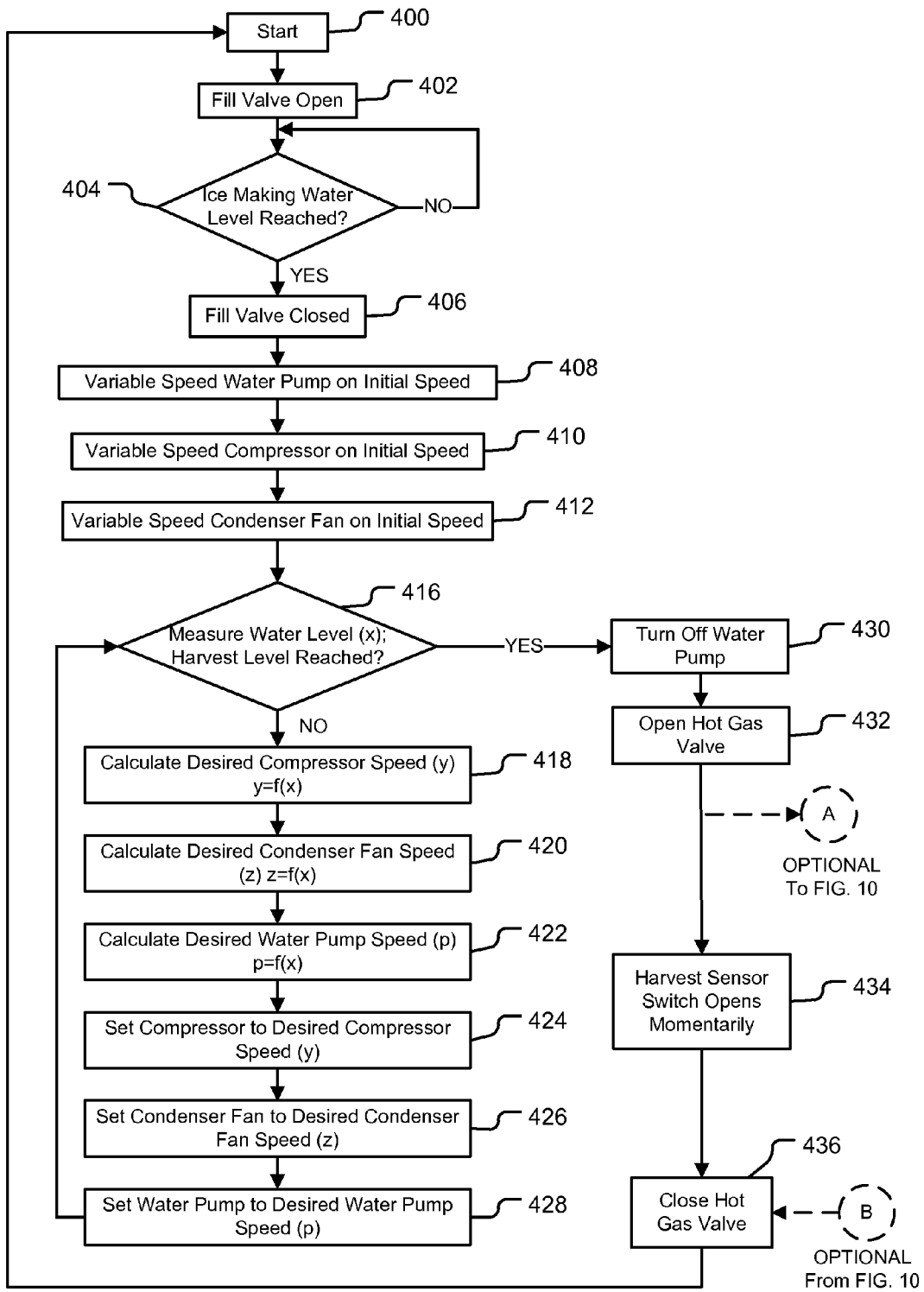
FIG. 4 is flow chart describing the operation of an ice maker having a refrigeration system which includes variable-operating point components controlled by a controller according to one embodiment of the invention.

Referring now to FIG. 4, a method of operating an embodiment of the invention as shown in FIG. 1 where the variable-operating point components are operated at variable-operating points during the cooling cycle is described in detail. At step 400, the cooling cycle, comprising both the sensible cooling cycle and the latent cooling cycle begins. At step 402, the water fill valve (not shown) is turned on, supplying water to sump 64. As water fills water sump 64, water enters openings 98 of air fitting 90 trapping air in chamber 92. The trapped air in chamber 92 and in pneumatic tube 86 is slightly compressed by the water, thereby communicating a pressure increase to pressure sensor 84. Pressure sensor 84 inputs this pressure as a voltage to processor 82 which assigns a numerical value to the voltage corresponding to a pressure scale which may be calibrated to a water level in sump 64. The state of the cooling cycle may be calibrated to the water level in sump 64. Controller 80 can thus monitor the water level in sump 64 and can control the variable-operating point components accordingly.

When the desired ice making water level is reached at step 404, controller 80 closes water fill valve at step 406. At step 408, variable-speed water pump 62 is running and set to an initial speed to supply water to freeze plate 60. At steps 410 and 412, variable-speed compressor 12 and variable-speed condenser fan 15 are turned on to initial speeds such that the refrigerant is supplied at an initial mass flow rate. In one embodiment, the initial speeds of variable-speed compressor 12 and variable-speed condenser fan 15 are the maximum speeds permitted by each component. The water that is supplied by variable-speed water pump 62 then, during the sensible cooling cycle, begins to cool as it contacts freeze plate 60, returns to water sump 64 below freeze plate 60 and is recirculated by variable-speed water pump 62 to freeze plate 60. Once the cooling cycle enters the latent cooling cycle, water that collects in the freeze plate 60 starts forming into ice cubes.

At step 416, controller 80 monitors water level, (x), based on pressure input from pressure sensor 84 checking whether the water level in sump 64 reaches the harvest level. While the water level in sump 64 is above the harvest level, controller 80 calculates a desired compressor speed, (y), as a function of water level (y=f(x)) (at step 418), calculates a desired condenser fan speed, (z), as a function of water level (z=f(x)) (at step 420), and calculates a desired water pump speed, (p), as a function of water level (p=f(x)) (at step 422). At step 424, controller 80 then sets variable-speed compressor 12 to desired compressor speed, (y), at a speed less than initial compressor speed (block 124) thereby varying the mass flow rate of the refrigerant from the initial refrigerant mass flow rate. At step 426, controller 80 also sets variable-speed condenser fan 15 to desired condenser fan speed, (z), at a speed less than initial condenser fan speed. At step 428, controller 80 also sets variable-speed water pump 62 to desired pump speed, (p), at a speed less than initial pump speed. Variable-speed water pump 62 continues to recirculate water from sump 64 over freeze plate 60 and the water level in sump 64 decreases as ice thickness increases on freeze plate 60.

Repeating steps 416-428, controller 80 continues to measure the water level in sump 64, calculate new desired speeds, and set desired speeds to maintain an adequate refrigerant mass flow rate to evaporator 20 and an adequate pressure drop across thermal expansion device 18 based upon the identified state of the cooling cycle until the water level in sump 64 reaches the harvest level. When the water level in sump 64 reaches the harvest level, variable-speed water pump 62 is turned off (at step 430) and hot gas valve 24 is opened (at step 432) allowing warm, high-pressure gas from compressor 12 to flow through hot gas bypass line 28a to enter evaporator 20. Ice is thereby harvested by warming freeze plate 60 to melt the formed ice to a degree such that the ice may be released from freeze plate 60 and falls through a hole (not shown) into a lower housing (e.g., an ice storage bin) (not shown) from where the ice can be temporarily stored and later retrieved. Accordingly, at step 434, harvest sensor switch opens momentarily for sensing when ice has been harvested from freeze plate 60. At step 436, hot gas valve 24 is then closed and the cooling cycle can repeat. While steps are described herein in one order, it will be understood that other embodiments of the method can be carried out in any order without departing from the scope of the invention.

Figure 9:
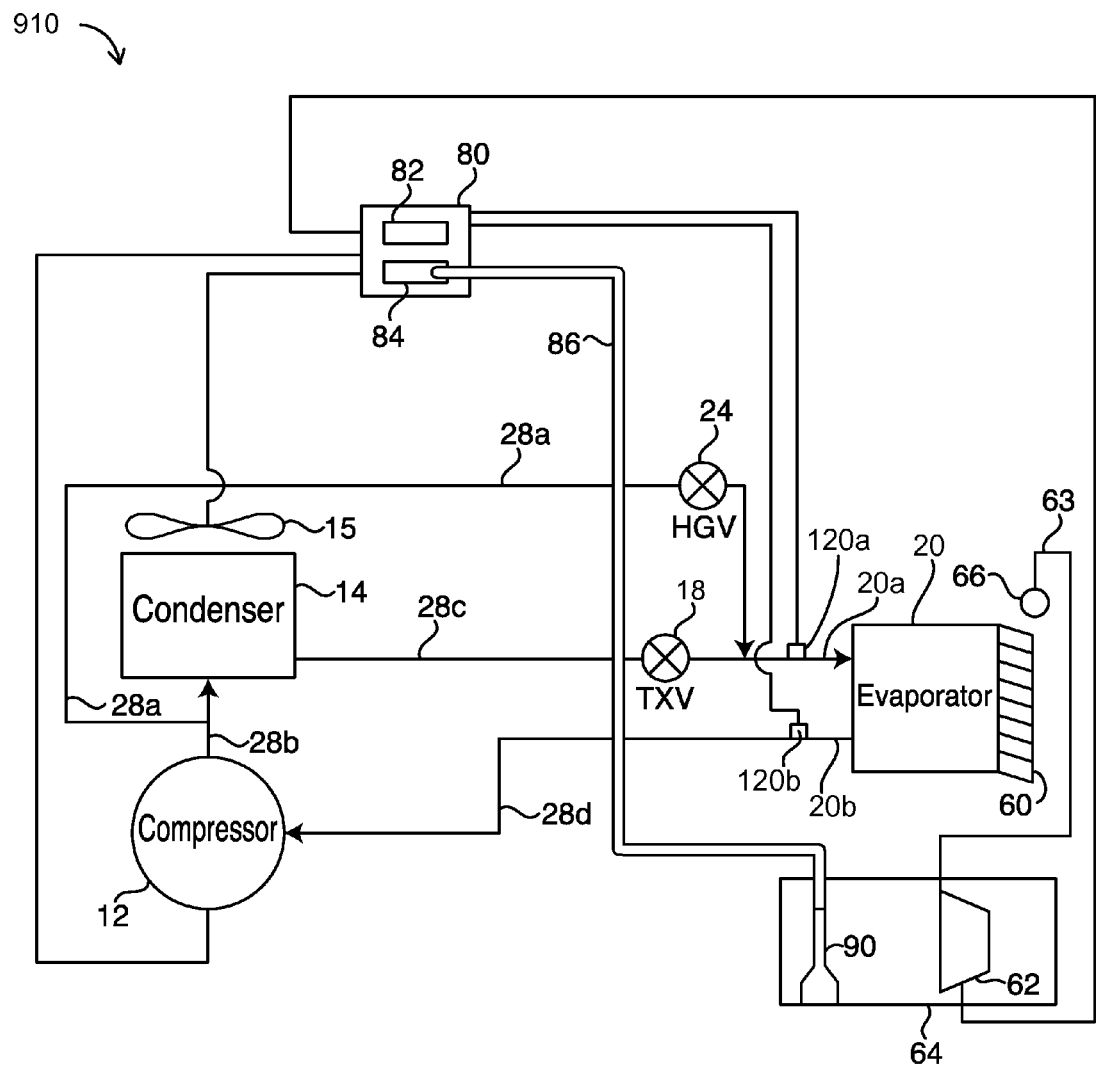
FIG. 9 is a schematic drawing of an ice maker having variable-operating point components, a controller, a first temperature sensor for measuring the inlet temperature of the refrigerant entering the evaporator, and a second temperature sensor for measuring the outlet temperature of the refrigerant exiting the evaporator, wherein the controller is adapted to control the operating points of the variable-operating point components in response to the measured inlet and outlet temperatures according to one embodiment of the invention.
Figure 10:
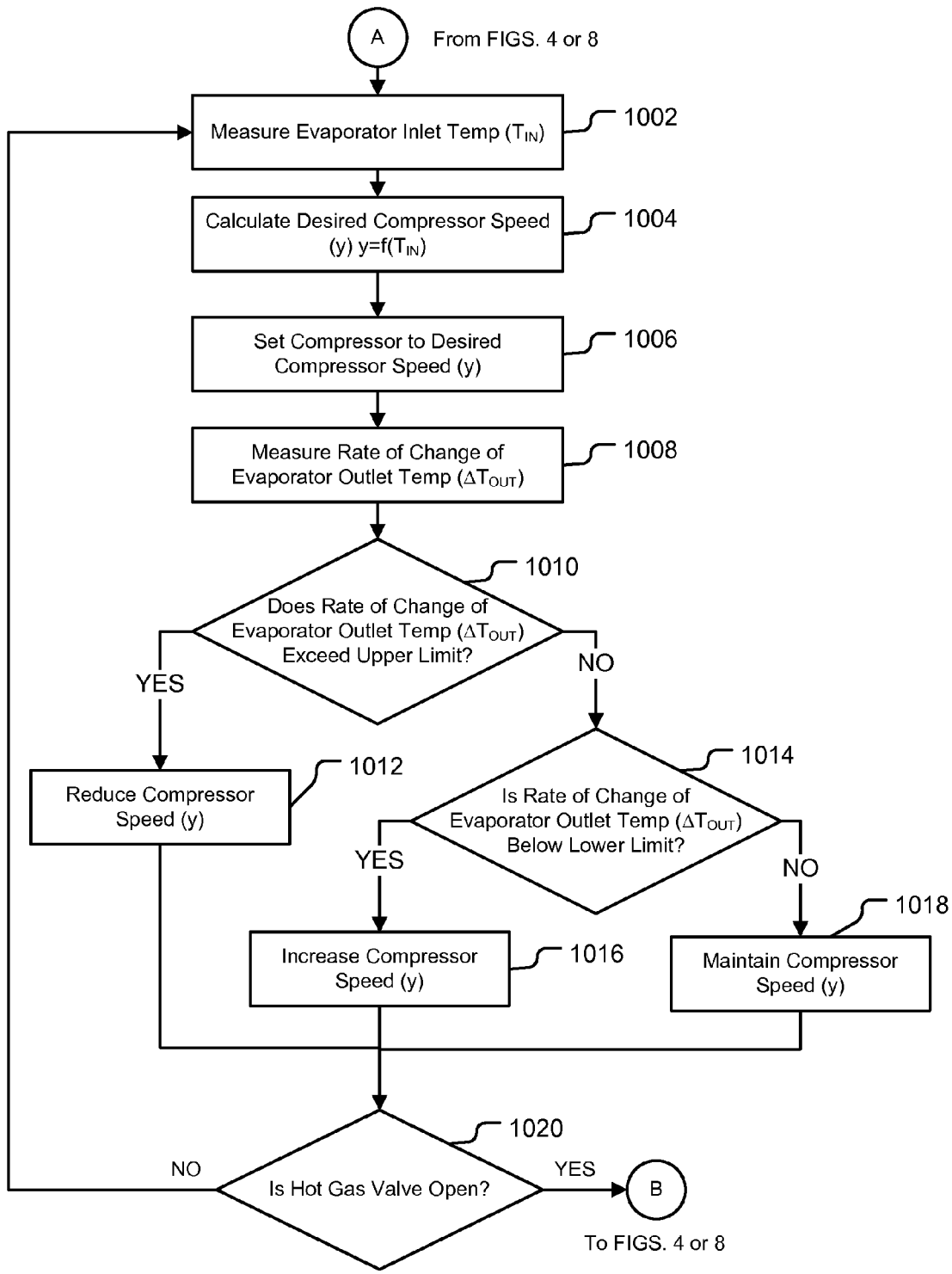
FIG. 10 is flow chart describing the operation of an ice maker having a refrigeration system which includes variable-operating point components controlled by a controller according to one embodiment of the invention.

As shown in FIG. 4, ice maker 10 may optionally operate the variable-speed compressor 12 at variable-speeds between steps A and B during harvest as described more fully elsewhere herein and illustrated for example in FIG. 10. Accordingly, as shown in FIG. 9, ice maker 10 may be equipped with temperature sensors 120a, 120b to measure the temperature of the refrigerant from variable-speed compressor 12 entering evaporator inlet 20a and evaporator outlet 20b, respectively, for operating variable-speed compressor, as described more fully elsewhere herein.

Ice maker 10 may include any combination of variable-operating point and single-operating point components (compressor, condenser fan, and/or water pump) and a thermostatic or electronic thermal expansion device. In a preferred embodiment, for example, ice maker 10 includes a variable-speed compressor, a variable-speed condenser fan, and a variable-speed water pump. Controller 80 thus varies the speed of the variable-speed compressor, variable-speed condenser fan, and the variable-speed water pump based upon the identified state of the cooling cycle. In another embodiment, for example, ice maker 10 includes a variable-speed compressor, a single-speed condenser fan, and a single-speed water pump. Controller 80 thus varies the speed of the variable-speed compressor based upon the identified state of the cooling cycle while operating the condenser fan and water pump at a single speed. In yet another embodiment, for example, ice maker 10 includes a variable-speed compressor, a variable-speed condenser fan, and a single-speed water pump. Controller 80 thus varies the speed of the variable-speed compressor and variable-speed condenser fan based upon the identified state of the cooling cycle while operating the single-speed water pump at a single speed. In yet another embodiment, for example, ice maker 10 includes a variable-speed compressor, a single-speed condenser fan, and a variable-speed water pump. Controller 80 thus varies the speed of the variable-speed compressor and variable-speed condenser water pump based upon the identified state of the cooling cycle while operating the single-speed condenser fan at a single speed. In yet another embodiment, for example, ice maker 10 includes a variable-speed compressor and a variable-speed water pump, but may lack a condenser fan (e.g., in the case of a liquid-cooled ice maker). Controller 80 thus varies the speed of the variable-speed compressor and variable-speed water pump based upon the identified state of the cooling cycle. In yet another embodiment, for example, ice maker 10 includes a variable-speed compressor and a single-speed water pump, but may lack a condenser fan. Controller 80 thus varies the speed of the variable-speed compressor based upon the identified state of the cooling cycle while operating the single-speed water pump at a single speed. In yet another embodiment, for example, ice maker 10 includes a single-speed compressor, a variable-speed condenser fan, and a single-speed water pump. Controller 80 thus varies the speed of the variable-speed condenser fan based upon the identified state of the cooling cycle while operating the single-speed compressor and single-speed water pump at a single speed. In yet another embodiment, for example, ice maker 10 includes a single-speed compressor, a variable-speed condenser fan, and a variable-speed water pump. Controller 80 thus varies the speed of the variable-speed condenser fan and the variable-speed water pump based upon the identified state of the cooling cycle while operating the single-speed compressor at a single speed. In yet another embodiment, for example, ice maker 10 includes a single-speed compressor, a single-speed condenser fan, and a variable-speed water pump. Controller 80 thus varies the speed of the variable-speed water pump based upon the identified state of the cooling cycle while operating the single-speed compressor and single-speed condenser fan at a single-speed. In yet another embodiment, for example, ice maker 10 includes a single-speed compressor and a variable-speed water pump, but may lack a condenser fan. Controller 80 thus varies the speed of the variable-speed water pump based upon the identified state of the cooling cycle while operating the single-speed compressor at a single-speed. Additionally, in certain embodiments, for example, any of the above combinations may include an electronic thermal expansion valve. Controller 80 may control the electronic thermal expansion valve based upon the identified state of the cooling cycle. The identified state of the cooling cycle can be determined by a variety of inputs, including, but not limited to, the temperature of the refrigerant in suction line 28d as the refrigerant exits the evaporator 20 (see FIGS. 9, 11, 12), the pressure of the refrigerant in suction line 28d as the refrigerant exits the evaporator 20 (see FIGS. 9, 11, 12), the water temperature in water sump 64 (see FIG. 7), a sensor 70 (see FIG. 6) that monitors the buildup of ice on freeze plate 60 during the cooling cycle, etc.

Figure 5:
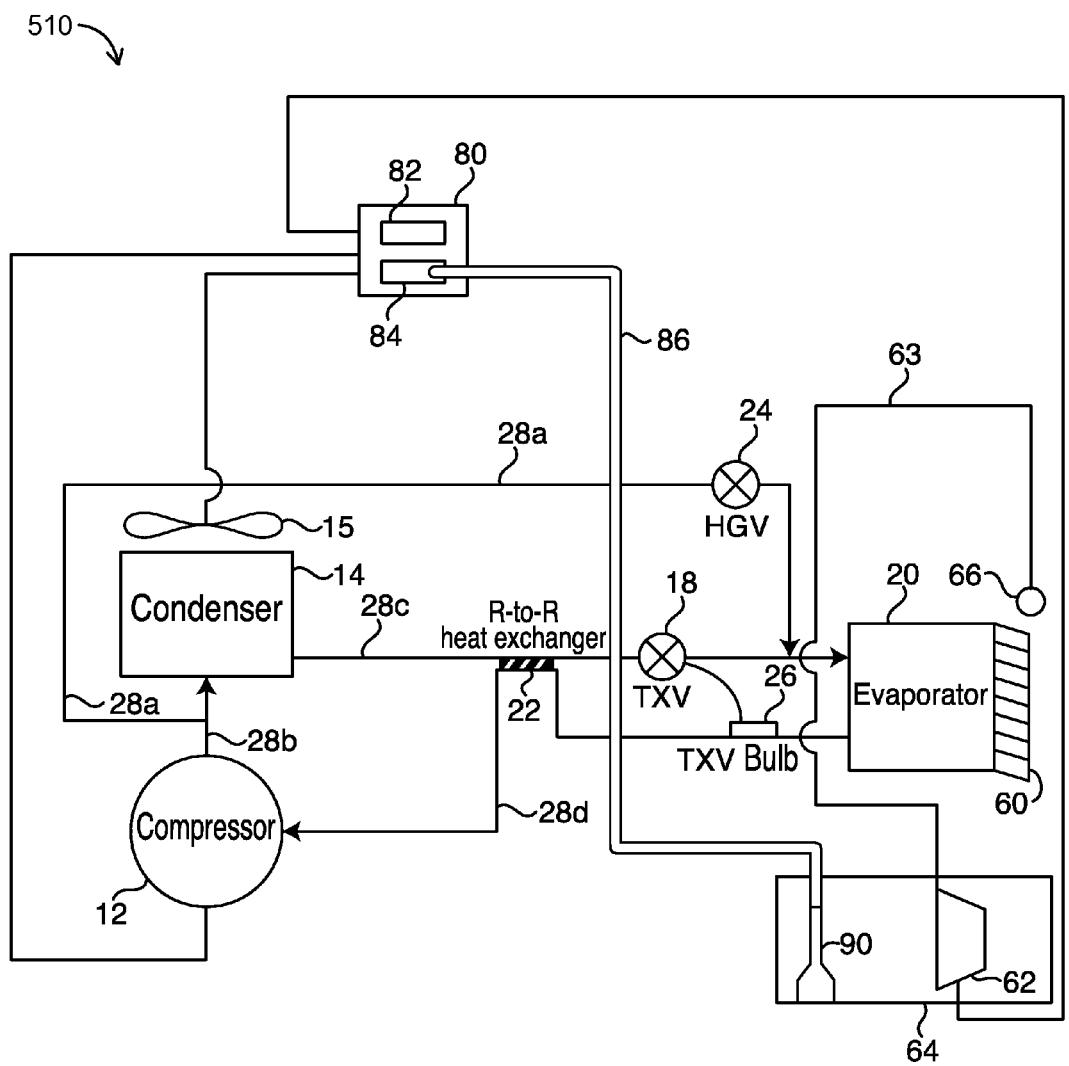
FIG. 5 is a schematic drawing of an ice maker having variable-operating point components, a controller with a pressure sensor for identifying the state of the cooling cycle and controlling the operating points of the variable-operating point components, and a refrigerant-to-refrigerant heat exchanger according to one embodiment of the invention.

In another embodiment, as illustrated in FIG. 5, ice maker 510 incorporates a form of refrigerant-to-refrigerant heat exchanger 22 located in the liquid refrigerant line 28c between condenser 14 and thermal expansion device 18. Refrigerant-to-refrigerant heat exchanger 22 uses the warm liquid refrigerant leaving condenser 14 to heat the cold refrigerant vapor leaving evaporator 20. By heating the refrigerant vapor leaving the evaporator 20, any liquid refrigerant remaining in that vapor stream is evaporated. This may assist in preventing any liquid refrigerant from returning to variable-speed compressor 12. As those skilled in the art will appreciate, liquid refrigerant returning to variable-speed compressor 12 could damage variable-speed compressor 12. In addition, using the cold refrigerant vapor leaving evaporator 20 to cool the liquid refrigerant that is entering evaporator 20 can boost the refrigeration performance of the system. Furthermore, refrigerant-to-refrigerant heat exchanger 22 may be useful in preventing flash gas. Any refrigerant gas bubbles present in the liquid leaving the condenser 14 can enter the expansion valve 18 and disrupt its operation. By cooling the liquid refrigerant with heat exchanger 22 prior to the liquid entering thermal expansion device 18, all bubbles can be eliminated thereby insuring the proper operation of thermal expansion device 18. Finally, by raising the refrigerant vapor temperature, the suction-line tubing downstream of evaporator 20 is less likely to frost or condense moisture from the surrounding air.

Accordingly, after exiting condenser 14, the high-pressure, substantially liquid refrigerant is routed through refrigerant-to-refrigerant heat exchanger 22. While passing through refrigerant-to-refrigerant heat exchanger 22, the high-pressure, substantially liquid refrigerant transfers heat to the low-pressure, substantially gaseous refrigerant passing through refrigerant-to-refrigerant heat exchanger 22 in the reverse direction en route to the inlet of variable-speed compressor 12 via suction line 28d. After exiting refrigerant-to-refrigerant heat exchanger 22, the high-pressure liquid refrigerant encounters thermal expansion device 18, which reduces the pressure of the substantially liquid refrigerant for introduction into evaporator 20. As the low-pressure expanded refrigerant is passed through tubing of evaporator 20, the refrigerant absorbs heat from the tubes contained within evaporator 20 and vaporizes as the refrigerant passes through the tubes. Low-pressure, substantially gaseous refrigerant is discharged from the outlet of evaporator 20, and passes through refrigerant-to-refrigerant heat exchanger 22 for re-introduction into the inlet of variable-speed compressor 12.

Figure 6:
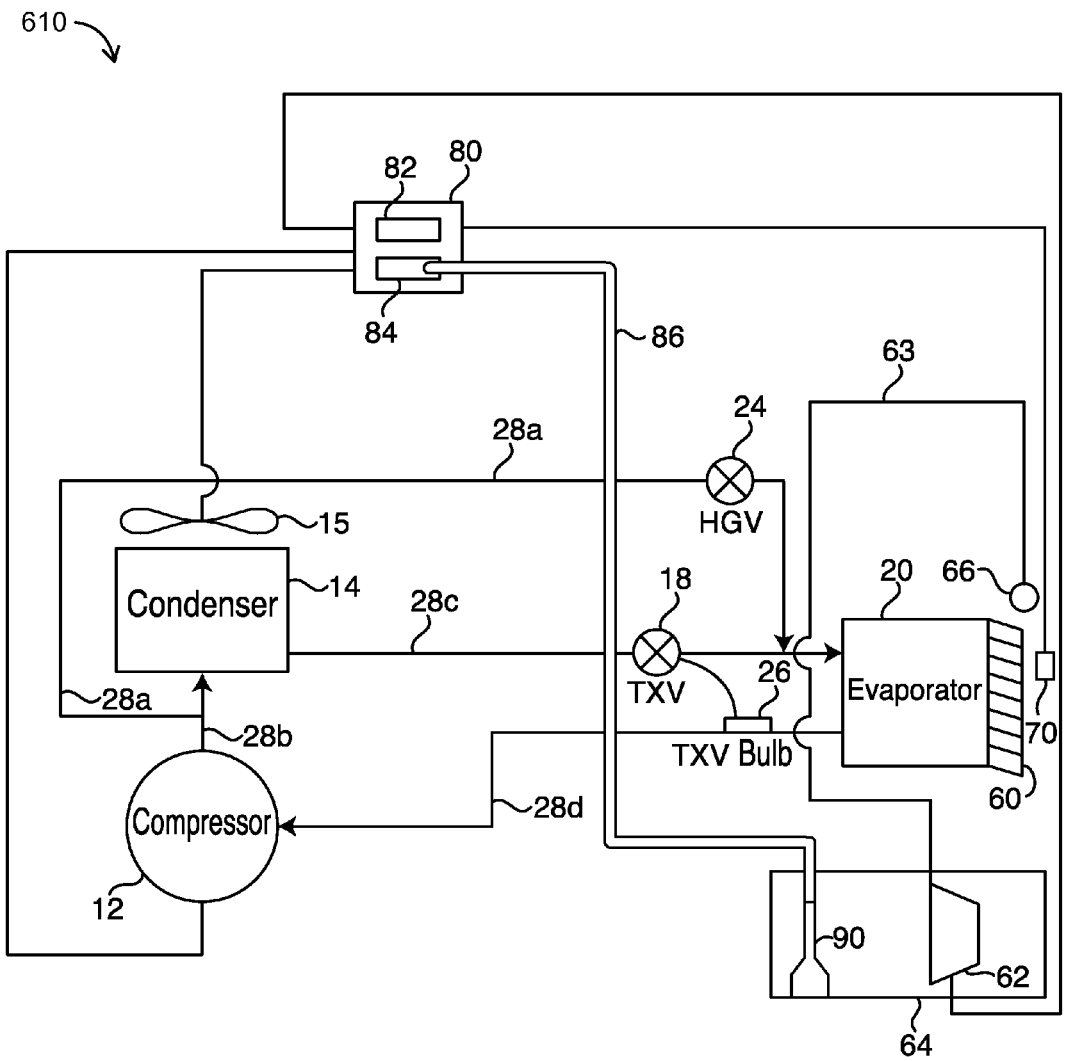
FIG. 6 is a schematic drawing of an ice maker having a refrigeration system which includes variable-operating point components, a controller with a pressure sensor for identifying the state of the cooling cycle and controlling the operating points of the variable-operating point components, and an additional sensor for identifying the state of the cooling cycle according to one embodiment of the invention.

In another embodiment of ice maker 610, illustrated by FIG. 6, pressure sensor 84, pneumatic tube 86, and air fitting 90 may be supplemented or replaced by sensor 70 that monitors the buildup of ice on freeze plate 60 during the cooling cycle. In various embodiments, the sensor may be any type of sensor adapted to monitor a thickness of ice on freeze plate 60. In one embodiment, for example, sensor 70 may be an acoustic sensor that detects changes in ice thickness on freeze plate 60 during the cooling cycle. An acoustic sensor for sensing the thickness of the formed ice is disclosed application U.S. Ser. No. 13/368,814 entitled "System, Apparatus, and Method for Ice Detection" filed on Feb. 8, 2012 by Rosenlund et al. which has published as US. Pub. No. 2012/0198864 which is incorporated herein by reference in its entirety. The application proposes an acoustic transmitter which transmits acoustic waves at certain frequencies and an acoustic sensor which senses the reflection of the transmitted waves. When the sensed, reflected waves reach a certain expected amplitude, the system determines that the ice has reached the desired thickness. The acoustic sensor may also be used to determine the thickness of the ice during the cooling cycle; as the cycle progresses the thickness of ice will change resulting in a change in the reflected waves received by the acoustic sensor. Controller 80 can then calculate and set the desired speeds of the variable-speed components based upon the identified state of the cooling cycle. In another embodiment, for example, sensor 70 may be a photo optical sensor that detects changes in ice thickness on freeze plate 60 during the cooling cycle. In yet another embodiment, for example, sensor 70 can comprise an electromechanical float mechanism that detects water level in sump 64. In yet another embodiment, sensor 70 may be an electrical probe positioned adjacent to freeze plate 60 such that when the ice reaches a desired thickness an electrical circuit is completed terminating the cooling cycle. In yet another embodiment, sensor 70 may identify the state of the cooling cycle based on elapsed time from the beginning of the cooling cycle. The output of sensor 70 may be fed into controller 80, wherein controller varies the speeds of the variable-speed components (variable-speed compressor, variable-speed condenser fan, and/or variable-speed water pump) based upon the identified state of the cooling cycle determined by water level in sump 64 and the output of sensor 70. In another embodiment, the ice maker includes sensor 70, but lacks pressure sensor 84, pneumatic tube 86, and air fitting 90. In this embodiment the output of sensor 70 may be fed into controller 80, wherein controller varies the speeds of the variable-speed components (variable-speed compressor, variable-speed condenser fan, and/or variable-speed water pump) based upon the identified state of the cooling cycle determined by the output of sensor 70.

Variable-Operating Points During Sensible Cooling

Figure 7:
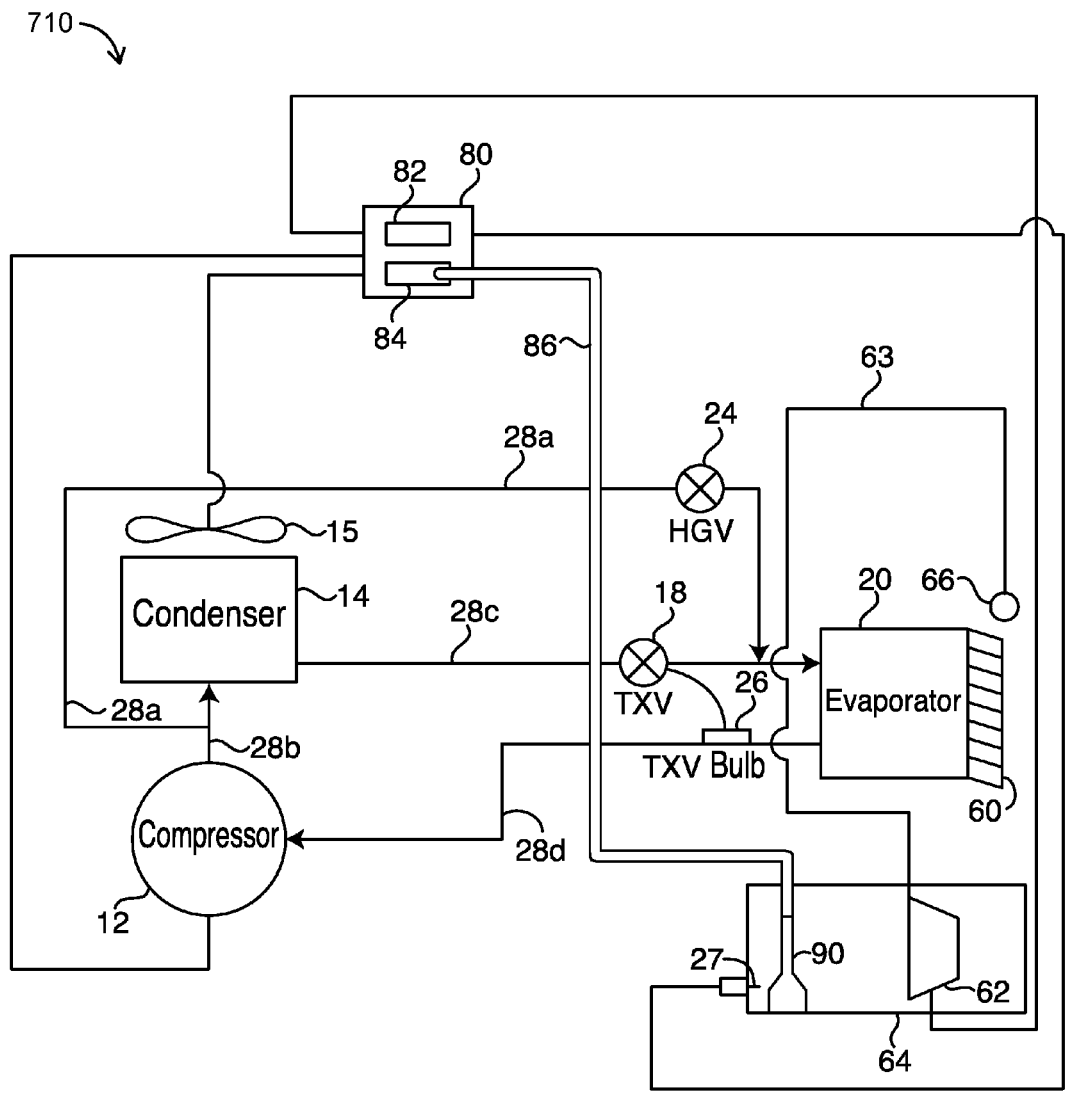
FIG. 7 is a schematic drawing of an ice maker having variable-operating point components and a controller with a temperature sensor and a pressure sensor for identifying the state of the cooling cycle and controlling the operating points of the variable-operating point components according to one embodiment of the invention.

In another embodiment, illustrated by FIG. 7, for example, the variable-operating point components of ice maker 710 operate at variable-operating points during both the sensible cooling cycle and the latent cooling cycle as refrigeration loads vary during both cycles. By varying the operating points of the variable-operating point components during the sensible cooling cycle, in addition to during the latent cooling cycle, ice maker 10 can cool the supply water down quickly by operating the variable-operating point components at their maximum operating points but can then slow the variable-operating point components to an operating point less than maximum operating point at the transition from the sensible cooling to the latent cooling cycle within the cooling cycle. This may assist in avoiding flash freezing the supply water.

FIG. 7 illustrates certain principal components of this embodiment of ice maker 710, which includes a variable-speed compressor 12, a condenser 14 for condensing compressed refrigerant vapor discharged from the variable-speed compressor 12, a variable-speed condenser fan 15, a thermal expansion device 18 for lowering the temperature and pressure of the refrigerant, and an evaporator 20. Thermal expansion device 18 may be a thermostatic expansion valve or an electronic expansion valve. Ice maker 710 also includes a freeze plate 60 thermally coupled to evaporator 20. Freeze plate 60 may contain a large number of pockets (usually in the form of a grid of cells) on its surface where water flowing over the surface can collect. As water is pumped from sump 64 by variable-speed water pump 62 through water line 63 and out of distributor manifold or tube 66, the water impinges freeze plate 60, flows over the pockets of freeze plate 60 and freezes into ice. Sump 64 may be positioned below freeze plate 60 to catch any water coming off of freeze plate 60 such that the water may be recirculated by variable-speed water pump 62.

Ice maker 710 may also include a temperature sensing bulb 26 placed at the outlet of the evaporator 20 to control thermal expansion device 18. In other embodiments, a temperature sensor 25 and a pressure transducer 29 may be used in place of a temperature sensing bulb (see FIGS. 11, 12) if an electronic expansion valve 118 (see FIGS. 11, 12) is used, wherein temperature sensor 25 and pressure transducer 29 may provide a temperature reading and pressure reading, respectively, of the refrigerant in suction line 28*d* to controller 80. A temperature sensor 27 may be positioned in sump 64 in order to measure the temperature of the water in sump 64. In addition a hot gas valve 24 may be used to direct warm refrigerant from variable-speed compressor 12 directly to evaporator 20 to remove or harvest ice cubes from freeze plate 60 when the ice has reached the desired thickness. Ice maker 710 may also include a harvest sensor switch (not shown) as known in the art for sensing when the ice has dropped from freeze plate 60 so that controller 80 can stop harvesting ice and resume making ice. As described more fully elsewhere herein, a form of refrigerant serially cycles through these components via lines 28*a*, 28*b*, 28*c*, 28*d*. Ice maker 710 may have other conventional components not described herein, including a water supply, an ice bin, and a source of electrical energy.

In this particular embodiment, ice maker 710 also comprises a controller 80 located remote from evaporator 20 and sump 64. Controller 80 includes a processor 82 for controlling the operation of ice making machine 710. In this embodiment, controller 80 may also include, or be coupled to, temperature sensor 27, which may be used to identify the state of the cooling cycle during the sensible cooling cycle. Using the input from temperature sensor 27, processor 82 can determine the state of the cooling cycle based upon the temperature of the water as it has been recirculated over the freeze plate. As the temperature of the water during the sensible cooling cycle decreases, the refrigeration load may decrease, thus controller 80 can calculate and set the operating points of the variable-operating point components of ice maker 710 based upon the state of the cooling cycle in relation to the refrigeration load. Controller 80 may also include, or be coupled to, a pressure sensor 84, which may be used to identify the state of the cooling cycle during the latent cooling cycle of ice maker 710 by correlating water pressure in sump 64 to the thickness of ice on freeze plate 60. Pressure sensor 84 may be a monolithic silicon pressure sensor that can output a signal to processor 82 that is proportional to the applied pressure of water within sump 64. Using the output from pressure sensor 84, processor 82 can determine the state of the cooling cycle based upon the amount of water that has been converted to ice. As thickness of ice in the freeze plate during the latent cooling cycle increases, the refrigeration load may decrease, thus controller 80 can calculate and set the operating points of the variable-operating point components of ice maker 710 based upon the state of the cooling cycle in relation to the refrigeration load. Accordingly, improved efficiencies for ice maker 710 may be achieved through the use of the variable-speed compressor 12 which can vary the liquid refrigerant mass flow rate based on the state of the cooling cycle, e.g. the mass flow of liquid refrigerant can be reduced as the thickness of ice on freeze plate 60 increases over the cooling cycle. The use of pressure sensor 84 also allows processor 82 to determine the appropriate time at which to initiate an ice harvest cycle as well as control the fill and purge functions.

Figure 8:
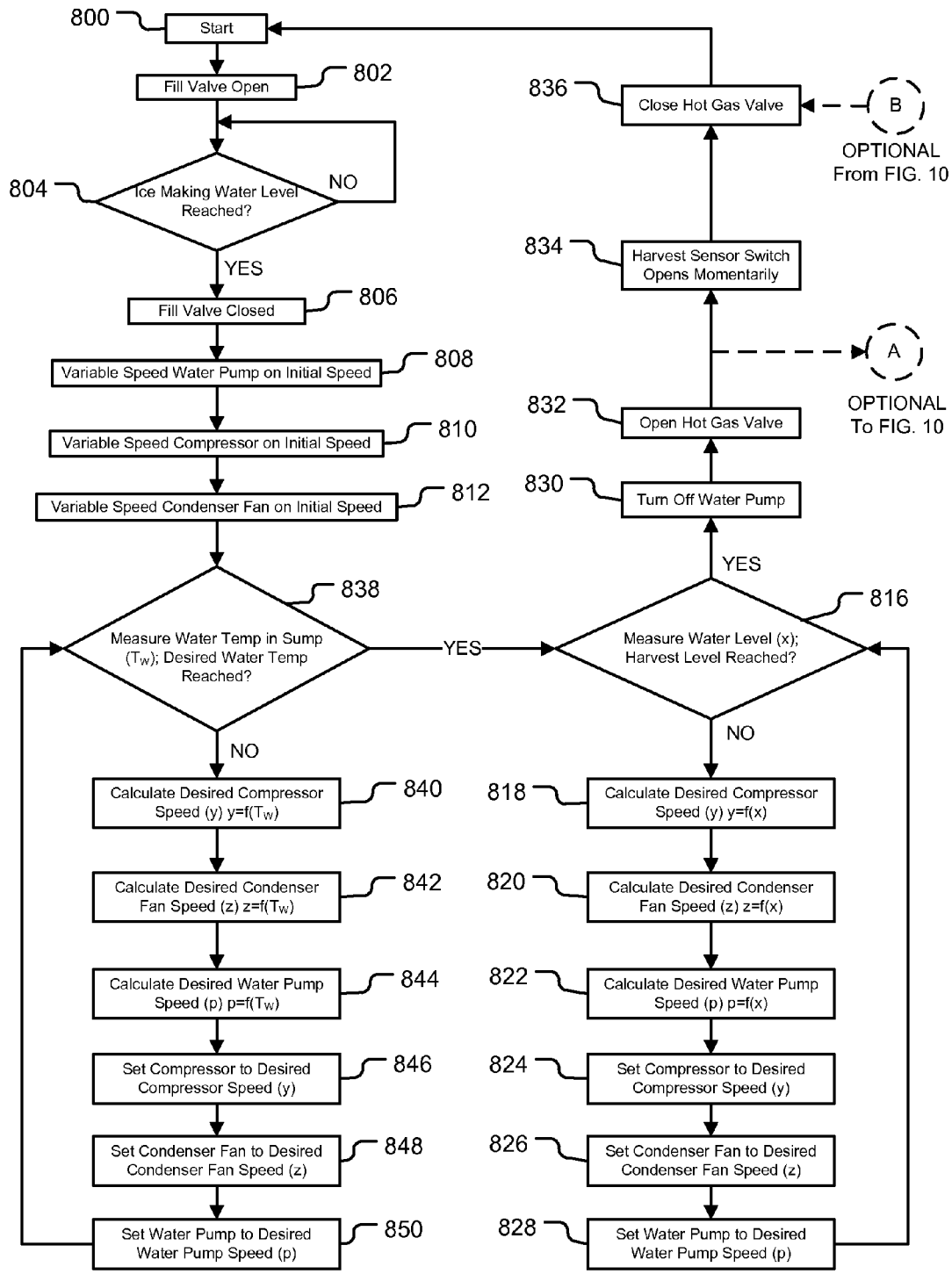
FIG. 8 is flow chart describing the operation of an ice maker having a refrigeration system which includes variable-operating point components controlled by a controller according to one embodiment of the invention.

Referring now to FIG. 8, a method of operating an embodiment of the invention as shown in FIG. 7 where the variable-operating point components are operated at variable-operating points during the sensible and latent cooling cycles is described in detail. At step 800, the cooling cycle, comprising both the sensible cooling cycle and the latent cooling cycle begins. At step 802, the water fill valve (not shown) is turned on, supplying water to sump 64. As water fills water sump 64, water enters openings 98 of air fitting 90 trapping air in chamber 92. The trapped air in chamber 92 and in pneumatic tube 86 is slightly compressed by the water, thereby communicating a pressure increase to pressure sensor 84. Pressure sensor 84 inputs this pressure as a voltage to processor 82 which assigns a numerical value to the voltage corresponding to a pressure scale which may be calibrated to a water level in sump 64. The state of the cooling cycle may be calibrated to the water level in sump 64. Controller 80 can thus monitor the water level in sump 64 and can control the variable-operating point components accordingly.

When the desired ice making water level is reached at step 804, controller 80 closes water fill valve at step 806. At step 808, variable-speed water pump 62 is running and set to an initial speed to supply water to freeze plate 60. At steps 810 and 812, variable-speed compressor 12 and variable-speed condenser fan 15 are turned on to initial speeds such that the refrigerant is supplied at an initial mass flow rate. In one embodiment, the initial speeds of variable-speed compressor 12 and variable-speed condenser fan 15 are the maximum speeds permitted by each component. The water that is supplied by variable-speed water pump 62 then, during the sensible cooling cycle, begins to cool as it contacts freeze plate 60, returns to water sump 64 below freeze plate 60 and is recirculated by variable-speed water pump 62 to freeze plate 60.

At step 838, the temperature $T_W$ of the recirculated water is then measured by temperature sensor 27 checking whether the water temperature $T_W$ is above a certain desired temperature. While the water temperature in sump 64 is above the desired temperature, controller 80 calculates a desired compressor speed, (y), as a function of water temperature (y=f($T_W$)) (at step 840), calculates a desired condenser fan speed, (z), as a function of water temperature (z=f($T_W$)) (at step 842), and calculates a desired water pump speed, (p), as a function of water temperature (p=f($T_W$)) (at step 844). At step 846, controller 80 then sets variable-speed compressor 12 to desired compressor speed, (y), at a speed less than initial compressor speed thereby varying the mass flow rate of the refrigerant from the initial refrigerant mass flow rate. At step 848, controller 80 also sets variable-speed condenser fan 15 to desired condenser fan speed, (z), at a speed less than initial condenser fan speed. At step 850, controller 80 also sets variable-speed water pump 62 to desired pump speed, (p), at a speed less than initial pump speed. Variable-speed water pump 62 continues to recirculate water from sump 64 over freeze plate 60 and the water temperature in sump 64 decreases during the sensible cooling cycle.

Repeating steps 838-850, controller 80 continues to measure water temperature, calculate new desired speeds and set desired speeds to maintain an adequate refrigerant mass flow rate to evaporator 20 and an adequate pressure drop across thermal expansion device 18 based upon the identified state of the cooling cycle until the water temperature in sump 64 reaches the desired temperature indicating the transition to the latent cooling cycle of the cooling cycle. Once the transition to the latent cooling cycle of the cooling cycle begins, controller 80 may reduce the speed of variable-speed compressor to avoid flash freezing the water.

Once the cooling cycle enters the latent cooling cycle, water that collects in the freeze plate 60 starts forming into ice cubes. At step 816, controller 80 monitors water level, (x), based on pressure input from pressure sensor 84 checking whether the water level in sump 64 reaches the harvest level. While the water level in sump 64 is above the harvest level, controller 80 calculates a desired compressor speed, (y), as a function of water level (y=f(x)) (at step 818), calculates a desired condenser fan speed, (z), as a function of water level (z=f(x)) (at step 820), and calculates a desired water pump speed, (p), as a function of water level (p=f(x)) (at step 822). Controller 80 then sets variable-speed compressor 12 to desired compressor speed, (y), at a speed less than initial compressor speed (at step 824) thereby varying the mass flow rate of the refrigerant from the initial refrigerant mass flow rate. At step 826, controller 80 also sets variable-speed condenser fan 15 to desired condenser fan speed, (z), at a speed less than initial condenser fan speed. At step 828, controller 80 also sets variable-speed water pump 62 to desired pump speed, (p), at a speed less than initial pump speed. Variable-speed water pump 62 continues to recirculate water from sump 64 over freeze plate 60 and the water level in sump 64 decreases as ice thickness increases on freeze plate 60.

Repeating steps 816-828, controller 80 continues to measure water level, calculate new desired speeds and set desired speeds to maintain an adequate refrigerant mass flow rate to evaporator 20 and an adequate pressure drop across thermal expansion device 18 based upon the identified state of the cooling cycle until the water level in sump 64 reaches the harvest level. When the water level in sump 64 reaches the harvest level, variable-speed water pump 62 is turned off (at step 830) and hot gas valve 24 is opened (at step 832) allowing warm, high-pressure gas from compressor 12 to flow through hot gas bypass line 28a to enter evaporator 20. Ice is thereby harvested by warming freeze plate 60 to melt the formed ice to a degree such that the ice may be released from freeze plate 60 and falls through a hole (not shown) into a lower housing (e.g., an ice storage bin) (not shown) from where the ice can be temporarily stored and later retrieved. Accordingly, at step 834, harvest sensor switch opens momentarily for sensing when ice has been harvested from freeze plate 60. At step 836, hot gas valve 24 is then closed and the cooling cycle can repeat. While steps are described herein in one order, it will be understood that other embodiments of the method can be carried out in any order without departing from the scope of the invention.

As shown in FIG. 8, ice maker 710 may optionally operate the variable-speed compressor 12 at variable-speeds between steps A and B during harvest as described more fully elsewhere herein and illustrated for example in FIG. 10. Accordingly, as shown in FIG. 9, ice maker 710 may be equipped with temperature sensors 120a, 120b to measure the temperature of the refrigerant from variable-speed compressor 12 entering evaporator inlet 20a and evaporator outlet 20b, respectively, for operating variable-speed compressor, as described more fully elsewhere herein.

In another embodiment of the invention where the variable-operating point components of ice maker 10 operate at variable-operating points during both the sensible cooling cycle and the latent cooling cycle as refrigeration loads vary during both cycles, ice maker 10 does not measure the temperature of the water in sump 64 to determine whether the cooling cycle is in the sensible cooling cycle or the latent cooling cycle. In this particular embodiment, a timer is used to determine whether the cooling cycle is in the sensible cooling cycle or the latent cooling cycle based on elapsed time. In one embodiment, for example, after about three minutes has elapsed since the beginning of the cooling cycle, ice maker 10 enters latent cooling cycle and controller 80 begins varying the operating point of the variable-operating point components. In another embodiment, for example, after about four minutes has elapsed since the beginning of the cooling cycle, ice maker 10 enters latent cooling cycle and controller 80 begins varying the operating point of the variable-operating point components. In another embodiment, for example, after about five minutes has elapsed since the beginning of the cooling cycle, ice maker 10 enters latent cooling cycle and controller 80 begins varying the operating point of the variable-operating point components. In another embodiment, for example, after about six minutes has elapsed since the beginning of the cooling cycle, ice maker 10 enters latent cooling cycle and controller 80 begins varying the operating point of the variable-operating point components. In another embodiment, for example, after about seven minutes has elapsed since the beginning of the cooling cycle, ice maker 10 enters latent cooling cycle and controller 80 begins varying the operating point of the variable-operating point components. Accordingly, in certain embodiments, controller 80 can begin varying the operating point of the variable-operating point components of ice maker 10 during the latent cooling cycle, between about three and about seven minutes after the beginning of the cooling cycle.

In yet another embodiment of the invention where the variable-operating point components of ice maker 10 operate at variable-operating points during both the sensible cooling cycle and the latent cooling cycle as refrigeration loads vary during both cycles, ice maker 10 does not measure the temperature of the water in sump 64 to determine whether the cooling cycle is in the sensible cooling cycle or the latent cooling cycle. Again, in this particular embodiment, a timer is used to determine whether the cooling cycle is in the sensible cooling cycle or the latent cooling cycle based on the percentage of time of the complete cooling cycle. In one embodiment, for example, after about 10 percent of the total time of the complete cooling cycle, ice maker 10 enters latent cooling cycle and controller 80 begins varying the operating point of the variable-operating point components. In another embodiment, for example, after about 20 percent of the total time of the complete cooling cycle, ice maker 10 enters latent cooling cycle and controller 80 begins varying the operating point of the variable-operating point components. In another embodiment, for example, after about 30 percent of the total time of the complete cooling cycle, ice maker 10 enters latent cooling cycle and controller 80 begins varying the operating point of the variable-operating point components. In another embodiment, for example, after about 40 percent of the total time of the complete cooling cycle, ice maker 10 enters latent cooling cycle and controller 80 begins varying the operating point of the variable-operating point components. In another embodiment, for example, after about 50 percent of the total time of the complete cooling cycle, ice maker 10 enters latent cooling cycle and controller 80 begins varying the operating point of the variable-operating point components. In another embodiment, for example, after about 60 percent of the total time of the complete cooling cycle, ice maker 10 enters latent cooling cycle and controller 80 begins varying the operating point of the variable-operating point components. In another embodiment, for example, after about 70 percent of the total time of the complete cooling cycle, ice maker 10 enters latent cooling cycle and controller 80 begins varying the operating point of the variable-operating point components. In another embodiment, for example, after about 80 percent of the total time of the complete cooling cycle, ice maker 10 enters latent cooling cycle and controller 80 begins varying the operating point of the variable-operating point components. In another embodiment, for example, after about 90 percent of the total time of the complete cooling cycle, ice maker 10 enters latent cooling cycle and controller 80 begins varying the operating point of the variable-operating point components. Accordingly, in certain embodiments, controller 80 can begin varying the operating point of the variable-operating point components of ice maker 10 during the latent cooling cycle, between after 10 percent to after 90 percent of the total time of the complete cooling cycle.

Variable-Operating Points During Harvest

In another embodiment, illustrated by FIG. 9, for example, the variable-operating point components of ice maker 910 operate at variable-operating points during the sensible cooling cycle, the latent cooling cycle, and the harvest cycle as refrigeration loads vary during these cycles. Specifically, variable-speed compressor 12 can operate at various speeds during the harvest cycle to aid in harvesting of the from freeze plate 60 without resulting in excessive melting of ice that has been formed in freeze plate 60.

FIG. 9 illustrates certain principal components of this embodiment of ice maker 910, which includes a variable-speed compressor 12, a condenser 14 for condensing compressed refrigerant vapor discharged from the variable-speed compressor 12, a variable-speed condenser fan 15, a thermal expansion device 18 for lowering the temperature and pressure of the refrigerant, and an evaporator 20. Thermal expansion device 18 may be a thermostatic expansion valve or an electronic expansion valve. Ice maker 910 also includes a freeze plate 60 thermally coupled to evaporator 20. Freeze plate 60 may contain a large number of pockets (usually in the form of a grid of cells) on its surface where water flowing over the surface can collect. As water is pumped from sump 64 by variable-speed water pump 62 through water line 63 and out of distributor manifold or tube 66, the water impinges freeze plate 60, flows over the pockets of freeze plate 60 and freezes into ice. Sump 64 may be positioned below freeze plate 60 to catch any water coming off of freeze plate 60 such that the water may be recirculated by variable-speed water pump 62.

In addition a hot gas valve 24 may be used to direct warm refrigerant from variable-speed compressor 12 directly to evaporator 20 via hot gas bypass line 28*a* to remove or harvest ice cubes from freeze plate 60 when the ice has reached the desired thickness. Ice maker 910 also includes a temperature sensor 120*a* for measuring the temperature of the warm refrigerant entering evaporator inlet 20*a* from hot gas valve 24 and a temperature sensor 120*b* for measuring the temperature of the refrigerant exiting evaporator outlet 20*b*. Although temperature sensors 120*a*, 120*b* are shown in relation to ice maker 910, it will be understood by one skilled in the art that temperature sensors 120*a*, 120*b* may be included on any of the embodiments of ice makers described herein for operating variable-speed compressor 12 during the harvest cycle without departing from the scope of the invention. Ice maker 910 may also include a harvest sensor switch (not shown) as known in the art for sensing when the ice has dropped from freeze plate 60 so that controller 80 can stop harvesting ice and resume making ice. As described more fully elsewhere herein, a form of refrigerant serially cycles through these components via lines 28*a*, 28*b*, 28*c*, 28*d*. Ice maker 910 may have other conventional components not described herein, including a water supply, an ice bin, and a source of electrical energy.

In this particular embodiment, ice maker 910 also comprises a controller 80 located remote from evaporator 20 and sump 64. Controller 80 includes a processor 82 for controlling the operation of ice making machine 910. In this embodiment, controller 80 may also include, or be coupled to, temperature sensors 120*a*, 120*b*, which may be used to monitor the harvest cycle. Using the inputs from temperature sensors 120*a*, 120*b*, processor 82 can determine the appropriate speed to operate variable-speed compressor 12 to assist in harvesting ice from freeze plate 60 without causing excessive ice melt. When hot gas valve 24 opens an initial charge of high temperature and high pressure refrigerant is directed into evaporator inlet 20*a* via hot gas bypass line 28*a*. This hot gas refrigerant will then flow through the serpentine tubing of evaporator 20 thereby warming freeze plate 60. The ice on freeze plate 60 may then begin to melt.

However, depending on the speed of variable-speed compressor 12 and/or the type of refrigerant used in the ice maker, the temperature increase in evaporator 12 and on freeze plate 60 may cause excessive melting of the ice on freeze plate 60. Excessive ice melting may be particular problem with the use of carbon dioxide ($CO_2$) as a refrigerant because the temperature of the hot $CO_2$ gas entering evaporator 20 through inlet 20a may be as high as 300 degrees F. The excessive melting of the ice results in smaller than desired ice and/or wet ice and represents inefficiencies by the waste of energy that was used to form the ice and energy that is used to harvest the ice. Accordingly, it would be beneficial to be able to operate variable-speed compressor 12 at variable-speeds during harvest in response to the refrigerant temperatures and/or rates of changes of the refrigerant temperatures at the inlet 20a and/or outlet 20b of evaporator 20.

Referring now to FIG. 10, a method of operating an embodiment of the invention as shown in FIG. 9 where the variable-speed compressor is operated at variable-speeds during the harvest cycle is described in detail. FIG. 10 only illustrates operation of ice maker 910 during the harvest cycle. Although this method is described with respect to ice maker 910, it will be understood by one skilled in the art, that any of the embodiments of ice maker described herein may operate variable-speed compressor 12 at variable-speeds during the harvest cycle. For example, after the ice maker has entered harvest by opening hot gas valve 24 (see FIGS. 4 and 8 steps 432 and 832, respectively) the ice maker may proceed to optional variable-speed compressor 12 operation during harvest at A. At step 1002, the temperature $T_{IN}$ of the refrigerant entering evaporator inlet 20a from hot gas bypass line 28a from variable-speed compressor 12 is measured by temperature sensor 120a. Based on the measured refrigerant temperature $T_{IN}$, at step 1004, controller 80 calculates a desired compressor speed, (y), as a function of the refrigerant temperature ($y=f(T_{IN})$). At step 1006, controller 80 then sets variable-speed compressor 12 to desired compressor speed, (y). At step 1008, the rate of change of the temperature ($\Delta T_{OUT}$) of the refrigerant exiting evaporator outlet 20b is measured by temperature sensor 120b. At step 1010, controller 80 monitors the rate of change of the temperature ($\Delta T_{OUT}$) of the refrigerant exiting evaporator outlet 20b to determine if the rate of change exceeds a desired upper limit. If the rate of change exceeds a desired upper limit, this indicates that the refrigerant temperature flowing through evaporator 20 is too high which results in excessive melting of the ice on freeze plate 60. Accordingly, if the rate exceeds the desired upper limit, at step 1012, controller 80 reduces the speed of variable-speed compressor 12 which thereby reduces the temperature of the refrigerant entering evaporator inlet 20a and thus reduces excessive melting of the ice on freeze plate 60.

If the rate does not exceed a desired upper limit, at step 1014, controller 80 monitors the rate of change of the temperature ($\Delta T_{OUT}$) of the refrigerant exiting evaporator outlet 20b to determine if the rate of change is below a desired lower limit. If the rate of change is below a desired lower limit, this indicates that the refrigerant temperature flowing through evaporator 20 is too low which results in longer than desired harvest times. Accordingly, if the rate is below the desired lower limit, at step 1016, controller 80 increases the speed of variable-speed compressor 12 which thereby increases the temperature of the refrigerant entering evaporator inlet 20a and thus increases melting of the ice on freeze plate 60 to result in the desired length of harvest. However, if the rate is above the desired lower limit, such that the rate of change is within the desired lower and upper limits, at step 1018, controller 80 maintains the speed of variable-speed compressor 12 set in step 1006. This assists in reducing excessive melting of the ice during harvest and in maintaining the desired length of harvest.

At step 1020, controller 80 monitors whether the harvest sensor switch has opened momentarily indicating that the ice has been harvested from freeze plate 60. If the harvest sensor switch has not opened, the process for varying the speed of variable-speed compressor 12 returns to step 1202 and repeats until the harvest sensor switch indicates that the ice has been harvested. If at step 1020, the harvest sensor switch has opened momentarily indicating that the ice has been harvested from freeze plate 60, then the process ends and returns to the methods shown in FIGS. 4 and 8 at B. In an alternative embodiment, for example, the ice maker may not include harvest sensor and may use the refrigerant temperature measured at evaporator outlet 20b by temperature sensor 120b to determine when harvest is complete. For example, a temperature of about 45 degrees F. to about 50 degrees F. (e.g., about 45 degrees F., about 46 degrees F., about 47 degrees F., about 48 degrees F., about 49 degrees F., about 50 degrees F.) measured at evaporator outlet 20b typically indicates that the ice has been harvested from freeze plate 60. While steps are described herein in one order, it will be understood that other embodiments of the method can be carried out in any order without departing from the scope of the invention.

Accordingly, variable-speed compressor 12 may operate at various speeds during the harvest cycle. For example, variable-speed compressor 12 may operate at a low speed at the start of the harvest cycle, may ramp up in speed during the harvest cycle, and may then slow down to a low speed at the end of the harvest cycle. In other embodiments, for example, variable-speed compressor 12 may operate at a high speed at the start of the harvest cycle and then may then slow down to a low speed at the end of the harvest cycle.

As described herein, in various embodiments of the ice maker 10, variable-speed compressor 12 may operate at a first speed during the sensible cooling cycle, a second speed during the latent cooling cycle, and a third speed during the harvest cycle. Preferably, the first speed is higher than the second speed and the second speed is higher than the third speed. Accordingly, variable-speed compressor 12 may operate at a high speed during the sensible cooling cycle, a medium speed during the latent cooling cycle, and a low speed during the harvest cycle. However, it will be understood that variable-speed compressor 12 may operate at higher or lower speeds during each of the sensible cooling cycle, the latent cooling cycle, and the harvest cycle. That is, the second speed may be higher than the first and/or third speeds, or the third speed may be higher than the first and/or second speeds.

In yet other embodiments of the ice maker 10, for example, variable-speed compressor 12 may operate at a first speed range during the sensible cooling cycle, a second speed range during the latent cooling cycle, and a third speed range during the harvest cycle. Preferably, the speeds in the first speed range are higher than the speeds in the second speed range and the speeds in the second speed range are higher than the speeds in third speed range. Accordingly, variable-speed compressor 12 may operate at a high range of speeds during the sensible cooling cycle, a medium range of speeds during the latent cooling cycle, and a low range of speeds during the harvest cycle. In various embodiments, for example, the first, second, and/or third speed ranges may at least partially overlap. That is, a portion of the first speed range may be within at least a portion of the second speed range, a portion of the second speed range may be within at least portion of the third speed range, and/or a portion of the first speed range may be within at least a portion of the third speed range.

Electronic Thermal Expansion Valve

Figure 11:
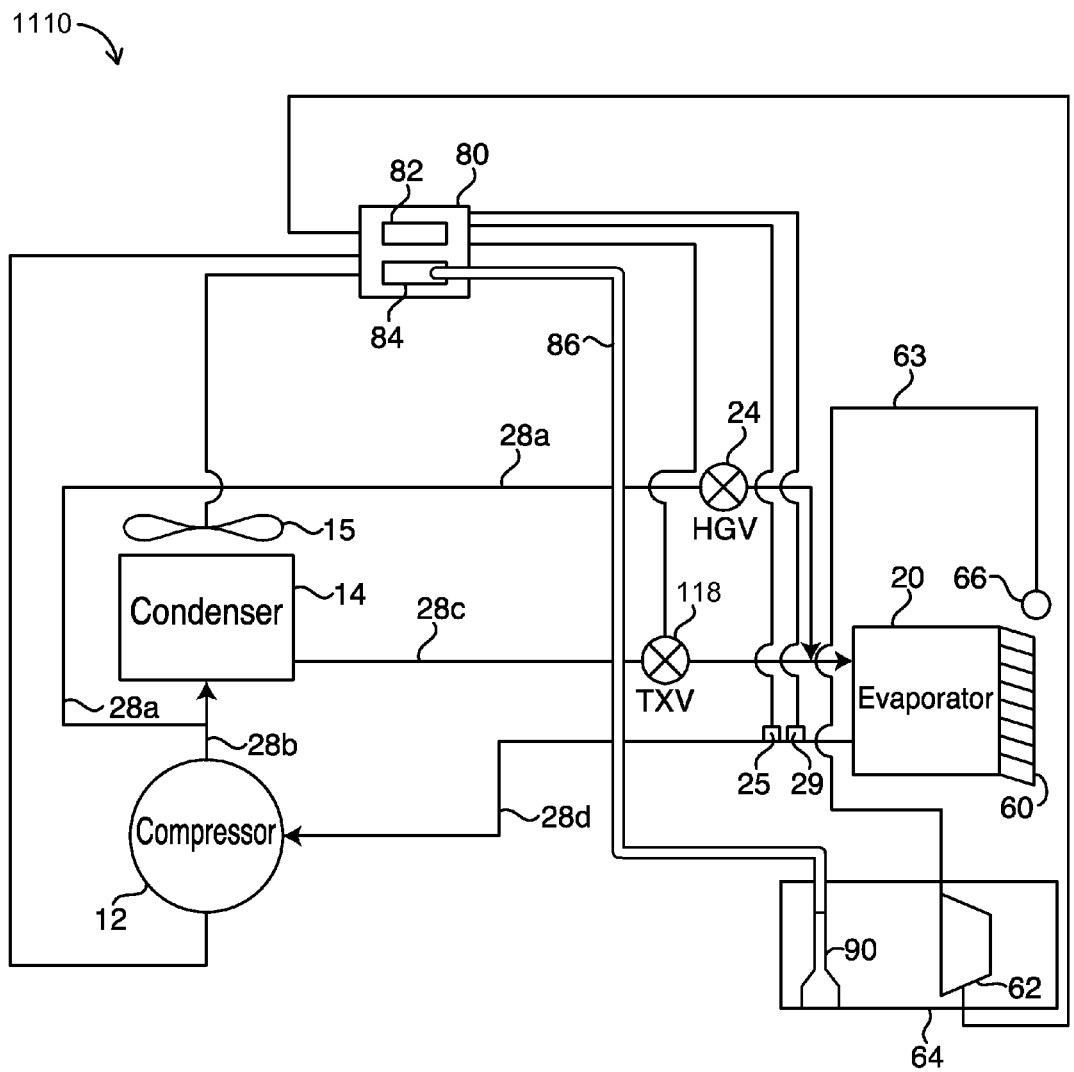
FIG. 11 is a schematic drawing of an ice maker having variable-operating point components and a controller with a temperature sensor for measuring the temperature of the refrigerant in a suction line, a pressure transducer for measuring the pressure of the refrigerant in the suction line, and a pressure sensor for identifying the state of the cooling cycle and controlling the operating points of the variable-operating point components according to one embodiment of the invention.
Figure 12:
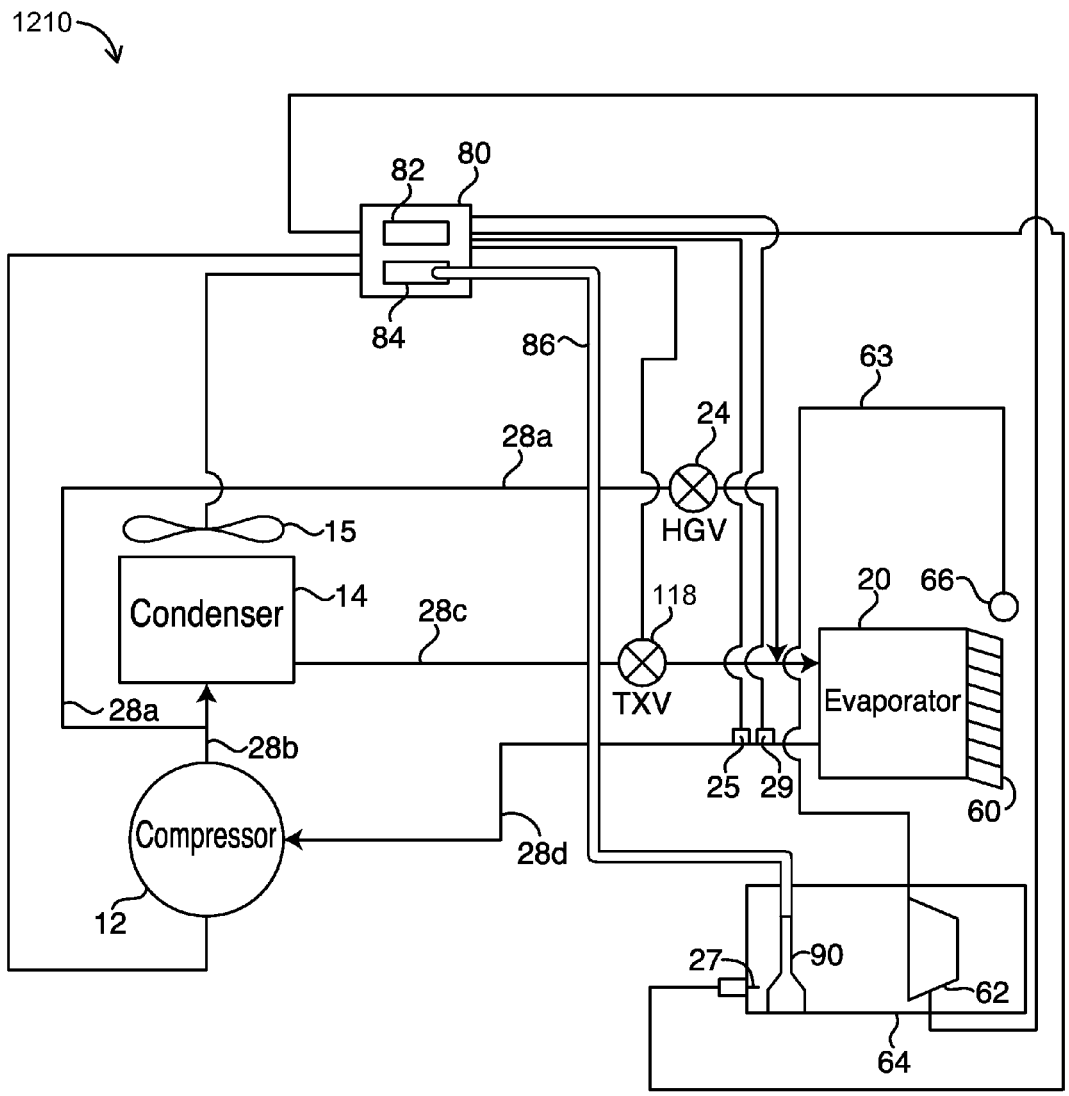
FIG. 12 is a schematic drawing of an ice maker having variable-operating point components and a controller with a temperature sensor for measuring the temperature of the refrigerant in a suction line, a pressure transducer for measuring the pressure of the refrigerant in the suction line, a temperature sensor for measuring the water temperature, and a pressure sensor for identifying the state of the cooling cycle and controlling the operating points of the variable-operating point components according to one embodiment of the invention.

In combination with any of the above described embodiments, an electronic thermal expansion valve may be used which may be controlled by controller 80 as illustrated in FIGS. 11 and 12. Accordingly, various embodiments of ice maker 1110, 1210, may include a variable-speed compressor 12, a condenser 14 for condensing compressed refrigerant vapor discharged from the variable-speed compressor 12, a variable-speed condenser fan 15, an electronic thermal expansion valve 118 for lowering the temperature and pressure of the refrigerant, and an evaporator 20. Electronic thermal expansion valve 118 may be controlled by controller 80 according to the temperature and pressure of the refrigerant in suction line 28d as the refrigerant exits the evaporator 20. A temperature sensor 25 may measure the temperature of the refrigerant in suction line 28d as the refrigerant exits the evaporator 20 and a pressure transducer 29 may measure the pressure of the refrigerant in suction line 28d as the refrigerant exits the evaporator 20. Temperature sensor 120b shown in FIG. 9 may be used in place of temperature sensor 25. The refrigerant temperature and pressure may be input into controller 80 which allows controller 80 to determine the saturation temperature of the refrigerant. Thus, by measuring the temperature and the pressure of the refrigerant in suction line 28d, controller 80 can control the size of the opening of electronic thermal expansion valve 118 to reduce or eliminate liquid refrigerant from exiting evaporator 20. Accordingly, electronic thermal expansion valve 118 can be controlled to increase and/or maintain the temperature of the refrigerant in suction line 28d as the refrigerant exits the evaporator 20 above the saturation temperature of the refrigerant. This is known as controlling the superheat temperature, wherein the superheat temperature is the temperature difference between the temperature of the refrigerant in suction line 28d and the saturation temperature of the refrigerant (i.e., superheat temperature=temperature of the refrigerant in suction line 28d−saturation temperature of the refrigerant).

Thus, there has been shown and described novel methods and apparatuses of an ice maker having a variable-operating point components. It will be apparent, however, to those familiar in the art, that many changes, variations, modifications, and other uses and applications for the subject devices and methods are possible. All such changes, variations, modifications, and other uses and applications that do not depart from the spirit and scope of the invention are deemed to be covered by the invention which is limited only by the claims which follow.

What is claimed is:

1. An ice maker for forming ice during a cooling cycle, the cooling cycle comprising a sensible cooling state and a latent cooling state, the ice maker comprising:
 a variable-speed compressor, a condenser, and an evaporator, wherein the variable-speed compressor, the condenser, and the evaporator are in fluid communication by one or more refrigerant lines, and wherein a refrigerant flows through the one or more refrigerant lines;
 a freeze plate thermally coupled to the evaporator;
 a sump located below the freeze plate;
 a water pump for supplying water from the sump to the freeze plate;
 a first sensing device adapted to measure a water level in the sump;
 a second sensing device adapted to measure a temperature of water in the sump; and
 a controller adapted to identify the state of the cooling cycle based on the temperature of the water in the sump and control the speed of the variable-speed compressor as a function of the temperature of the water in the sump during the sensible cooling state and control the speed of the variable-speed compressor as a function of the water level in the sump during the latent cooling state.

2. The ice maker of claim 1 wherein the controller is adapted to operate the variable-speed compressor at a first speed during a sensible cooling cycle, a second speed during a latent cooling cycle, and a third speed during a harvest cycle, wherein the first speed is higher than the second speed and the third speed is higher than the first speed.

3. The ice maker of claim 1 further comprising a third sensing device is adapted to monitor a thickness of ice on the freeze plate.

4. The ice maker of claim 1 wherein one of the one or more refrigerant lines comprises a suction line between the compressor and the evaporator and wherein the ice maker further comprises an electronic thermal expansion valve in fluid communication with the suction line.

5. The ice maker of claim 4 further comprising a temperature sensor and a pressure transducer, wherein the temperature sensor is adapted to measure the temperature of the refrigerant in the suction line and wherein the pressure transducer is adapted to measure the pressure of the refrigerant in the suction line; and
 wherein the controller is adapted to control the electronic thermal expansion valve based upon the measured temperature and pressure of the refrigerant in the suction line.

6. The ice maker of claim 1 further comprising a variable-speed condenser fan and wherein the controller is adapted to further control the speed of the variable-speed condenser fan based on the identified state of the cooling cycle.

7. The ice maker of claim 1, wherein the water pump is a variable-speed water pump and wherein the controller is further adapted to control the speed of the variable-speed water pump based on the identified state of the cooling cycle.

8. The ice maker of claim 1, further comprising a variable-speed condenser fan and wherein the water pump is a variable-speed water pump, and wherein the controller is further adapted to control the speed of the variable-speed condenser fan and the speed of the variable-speed water pump based on the identified state of the cooling cycle.

9. The ice maker of claim 8 wherein one of the one or more refrigerant lines comprises a suction line between the compressor and the evaporator and wherein the ice maker further comprises an electronic thermal expansion valve in fluid communication with the suction line.

10. The ice maker of claim 9 further comprising a temperature sensor and a pressure transducer, wherein the temperature sensor is adapted to measure the temperature of the refrigerant in the suction line and wherein the pressure transducer is adapted to measure the pressure of the refrigerant in the suction line; and wherein the controller is adapted to control the electronic thermal expansion valve based upon the measured temperature and pressure of the refrigerant in the suction line.

11. The ice maker of claim 1 further comprising a first temperature sensor for measuring an inlet temperature of the refrigerant entering the evaporator and a second temperature sensor for measuring an outlet temperature of the refrigerant exiting the evaporator, wherein the controller is adapted to vary the speed of the variable-speed compressor during a harvest cycle in response to the measured inlet and outlet refrigerant temperatures.

12. The icemaker of claim 11 wherein the controller is adapted to vary the speed of the variable-speed compressor during the harvest cycle in response to a rate of change of the measured outlet refrigerant temperature.

13. The ice maker of claim 1 further comprising a thermal expansion device in fluid communication with and located between the condenser and the evaporator, and a refrigerant-to-refrigerant heat exchanger in fluid communication with and located between the condenser and the thermal expansion device, the refrigerant-to-refrigerant heat exchanger further in fluid communication with and located between the evaporator and the variable-speed compressor to remove heat from the refrigerant discharged from the condenser assembly.

14. A method of controlling an ice maker for forming ice during a cooling cycle, the cooling cycle comprising a sensible cooling state and a latent cooling state, the ice maker comprising a variable-speed compressor, a condenser, and an evaporator, wherein the variable-speed compressor, the condenser, and the evaporator are in fluid communication by one or more refrigerant lines, and wherein a refrigerant flows through the one or more refrigerant lines; a freeze plate thermally coupled to the evaporator; a sump located below the freeze plate; a water pump for supplying water from the sump to the freeze plate; a first sensing device adapted to measure a water level in the sump; a second sensing device adapted to measure a temperature of the water in the sump; and a controller adapted to control the speed of the variable-speed compressor, the method comprising:
  identifying the state of the cooling cycle based on the temperature of the water in the sump;
  calculating a first desired compressor speed of the variable-speed compressor as a function of the temperature of the water in the sump during the sensible cooling state;
  varying the speed of the variable-speed compressor to the first desired compressor speed during the sensible cooling state thereby varying the mass flow rate of the refrigerant;
  calculating a second desired compressor speed of the variable-speed compressor as a function of the water level in the sump during the latent cooling state; and
  varying the speed of the variable-speed compressor to the second desired compressor speed during the latent cooling state thereby varying the mass flow rate of the refrigerant.

15. The method of claim 14 wherein the ice maker further comprises a first temperature sensor for measuring an inlet temperature of the refrigerant entering the evaporator and a second temperature sensor for measuring an outlet temperature of the refrigerant exiting the evaporator and wherein the controller is adapted to vary the speed of the variable-speed compressor during a harvest cycle in response to the measured inlet and outlet refrigerant temperatures, the method further comprising:
  measuring the inlet temperature of the refrigerant entering the evaporator;
  measuring the outlet temperature of the refrigerant exiting the evaporator;
  calculating a desired condenser fan speed of the variable-speed condenser fan based upon the measured inlet and outlet temperatures of the refrigerant entering and exiting the evaporator; and
  varying the speed of the variable-speed condenser fan to the desired condenser fan speed.

16. The method of claim 14 wherein the ice maker further comprises a variable-speed condenser fan and wherein the controller is adapted to further control the speed of the variable-speed condenser fan based on the identified state of the cooling cycle, the method further comprising:
  calculating a desired condenser fan speed of the variable-speed condenser fan based upon the identified state of the cooling cycle; and
  varying the speed of the variable-speed condenser fan to the desired condenser fan speed.

17. The method of claim 14 wherein the water pump is a variable-speed water pump and wherein the controller is further adapted to control the speed of the variable-speed water pump based on the identified state of the cooling cycle, the method further comprising:
  calculating a desired water pump speed of the variable-speed water pump based upon the identified state of the cooling cycle; and
  varying the speed of the variable-speed water pump to the desired water pump speed.

18. The method of claim 14 wherein the ice maker further comprises a variable-speed condenser fan and wherein the water pump is a variable-speed water pump, and wherein the controller is further adapted to control the speed of the variable-speed condenser fan and the speed of the variable-speed water pump based on the identified state of the cooling cycle, the method further comprising:
  calculating a desired condenser fan speed of the variable-speed condenser fan based upon the identified state of the cooling cycle;
  calculating a desired water pump speed of the variable-speed water pump based upon the identified state of the cooling cycle;
  varying the speed of the variable-speed condenser fan to the desired condenser fan speed; and
  varying the speed of the variable-speed water pump to the desired water pump speed.

* * * * *